(12) United States Patent
Anzai et al.

(10) Patent No.: US 6,733,143 B1
(45) Date of Patent: May 11, 2004

(54) LIGHT SHIELDING STRUCTURE

(75) Inventors: Hiroshi Anzai, Fujisawa (JP); Takemi Namba, Tsukuba (JP); Hirokazu Yamamoto, Fujisawa (JP); Yoshimi Imamoto, Fujisawa (JP); Takao Kanno, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/926,649

(22) Filed: Nov. 28, 2001

(30) Foreign Application Priority Data

May 28, 1999 (JP) .......................................... 11/150559

(51) Int. Cl.$^7$ .............................................. G02B 27/00
(52) U.S. Cl. ...................................... 359/513; 359/601
(58) Field of Search .................... 359/513, 600, 359/601, 611, 614, 738

(56) References Cited

U.S. PATENT DOCUMENTS 3,910,687 A * 10/1975 Iwata ........................ 359/228
4,598,914 A     7/1986 Furumura et al. ............. 277/80

FOREIGN PATENT DOCUMENTS

| JP | 56-42766 | 4/1981 |
| JP | 63-178672 | 11/1988 |
| JP | 63-285369 | 11/1988 |
| JP | 64-39926 | 3/1989 |
| JP | 4-101868 | 9/1992 |
| JP | 5-94578 | 12/1993 |
| JP | 7-77282 | 3/1995 |

* cited by examiner

Primary Examiner—Mark A. Robinson
(74) Attorney, Agent, or Firm—Jacobson Holman PLLC

(57) ABSTRACT

There is provided a light shielding apparatus with a light shielding seal 1 that reduces a sliding resistance and, at the same time, improves light shielding property and realizes saving of a space. There is provided a light shielding structure that is provided between a plurality of members 13 and 14, which are arranged to be able to move relatively to each other spaced a predetermined distance apart, and is capable of preventing light from entering from a gap to be formed between these plurality of members 13 and 14, having magnetic force generating means 2 and 3 that are disposed in any one of the above-mentioned plurality of members 13 and 14 and magnetic fluid 4 which is magnetically held by the magnetic force generating means 2 and 3 and contacts the other member and shielding a gap, which is formed between the above-mentioned plurality of members 13 and 14, by the above-mentioned magnetic fluid 4.

9 Claims, 23 Drawing Sheets

FIG. 12
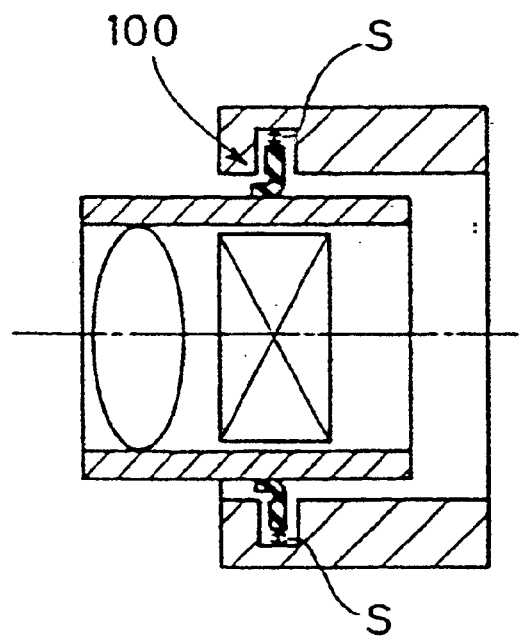
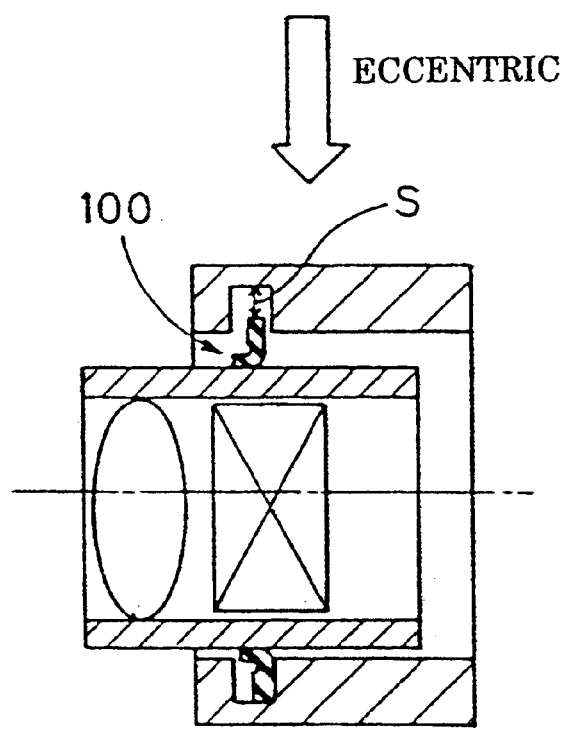
ECCENTRIC

FIG. 16
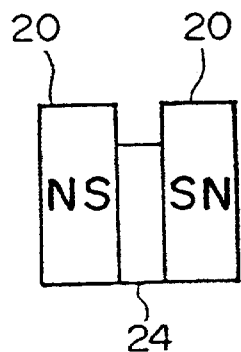
FIG. 17
(A) 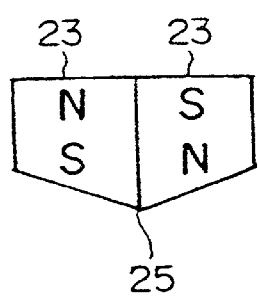   (B) 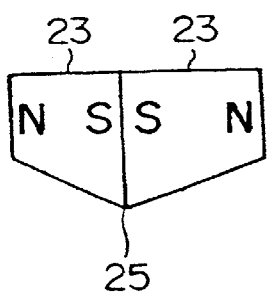
FIG. 18
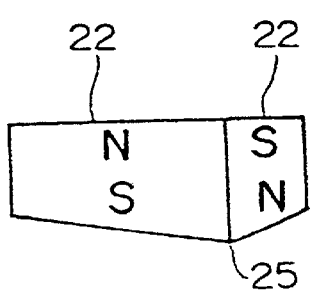   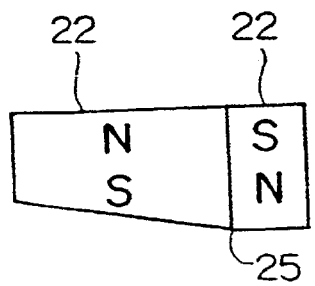

LIGHT SHIELDING STRUCTURE

This is a nationalization of PCT/JP00/03442 filed May 29, 2000 and published in Japanese.

TECHNICAL FIELD

The present invention relates to a light shielding structure for shielding light, for example, to a light shielding structure for use in light shielding among a plurality of lens barrels of a camera provided with a zooming function.

BACKGROUND ART

Conventionally, with a light shielding seal forming a light shielding structure such as a zoom lens section or the like of a camera of this type, a strong force is not applied to the seal itself and sliding is performed at a relatively low speed and less frequently compared with an oil seal or the like.

As a structure conventionally known, there are, for example, (1) a light shielding seal of oleo-silicone rubber, (2) a light shielding seal of silicone rubber coated with PTFE, (3) a light shielding seal of oleo-silicone rubber baked on a metal fitting and (4) a light shielding seal of silicone rubber coated with PTFE which is baked on a metal fitting.

FIG. 11 shows the light shielding seal of (4). In FIG. 11, a light shielding seal 100 is configured by adhering a seal lip section 101 consisting of a ring of silicone rubber coated with PTFE and a reinforcing section 102 consisting of a metal ring as a metal fitting.

An end of a seal bore of the seal lip section 101 is provided on a diameter that is slightly smaller than an outer diameter of a lens barrel 200.

Then, in use, the lens barrel 200 is inserted into the seal bore and the seal lip section 101 is deformed in an L shape and closely adhere to the lens barrel 200 by its tensile force, whereby light and dusts are prevented from entering the seal bore when the lens barrel moves back and forth in zooming in and out and light shielding property and sealing property are given.

In this way, the conventional light shielding seal realizes decrease of a sliding resistance by impregnating the seal lip section with oil or coating it with PTFE.

However, in the case of the above-mentioned conventional art, the following problems occur.

In recent years, a compact camera has been miniaturized and realizes multi-functionality. On the other hand, an amount of an electric power from a power source of the compact camera is limited, thus reduction of an electric power is intended for each unit.

Under such circumstances, with the conventional light shielding seal, however much effort is consumed to reduce a sliding resistance by impregnating the light shielding seal with oil or coating it with PTFE, its reducing effect is limited due to sliding by the lens barrel and the light shielding seal that are solids contacting with each other. For example, even with the above-mentioned light shielding seal of (4) having a relatively low sliding resistance, a sliding resistance per piece is large at 20 to 100 gf.

Since the sliding resistance of the light shielding seals is large as described above, a relatively large amount of an electric power is consumed during zooming.

On the other hand, when a lens barrel expands and contracts, since a space for installing a light shielding seal varies according to an eccentric quantity of the lens barrel, if an eccentric quantity is large, a light shielding seal is crushed where the space for installing a light shielding seal is small and a gap arises where the space is large and thus leakage of light occurs even if the entire light shielding seal is made of rubber.

Thus, with a conventional light shielding device, it is required to provide a space S that is equal to or larger than an eccentric quantity on an outer diameter side of a light shielding seal as shown in FIG. 11 even if the light shielding device is intended to be miniaturized. The light shielding device is configured such that, if a lens barrel is eccentric, this space S absorbs an eccentric quantity to prevent a function of the light shielding seal from being deteriorated as shown in FIG. 12.

In addition, in some cases, a lens barrel has a flash (parting line) on a parting surface, from which light leaks.

The present invention has been devised in order to solve the above-mentioned problems of the conventional art, and a technical subject of a first aspect of the present invention to provide a light shielding structure that is capable of reducing a sliding resistance and at the same time improving light shielding property and further realizing saving of a space.

It is another technical subject of a second to fourth and fourteenth aspects of the present inventions to provide a light shielding structure that is capable of securing a larger power for holding magnetic fluid and shielding light more surely.

It is another technical subject of a fifth aspect of the present invention to provide a light shielding structure that is capable of securing a larger power for holding magnetic fluid and effectively absorbing an error even if an error of assembling or the like occurs among a plurality of members.

It is another technical subject of a sixth aspect of the present invention to provide a light shielding structure that is capable of further improving a light shielding effect.

It is another technical subject of seventh and eighth aspects of the present invention to provide a light shielding structure that is capable of securing a larger power for holding magnetic fluid and shielding light more surely.

It is another technical subject of a ninth aspect of the present invention to provide a light shielding structure that is capable of performing light shielding surely among lens barrels in a camera having a plurality of lens barrels.

It is another technical subject of a tenth aspect of the present invention to provide a light shielding structure of a lens barrel of a camera in which a lens barrel is easily.

It is another technical subject of an eleventh aspect of the present invention to provide a light shielding structure that is capable of effectively absorbing the error even if an error occurs in an axial centers of lens barrels of a camera.

It is another technical subject of a twelfth aspect of the present invention to provide a light shielding structure that is capable of effectively preventing dusts from entering the inside of a lens barrel from the outside.

It is another technical subject of a thirteenth aspect of the present invention to provide a light shielding structure that is capable of holding magnetic fluid surely in a position of magnetic force generating means without allowing the magnetic fluid contacting a lens barrel to flow away even if the lens barrel of a camera moves forward or backward.

It is another technical subject of a fourteenth aspect of the present invention of the present invention to provide a light shielding structure that is capable of preventing wetting of magnetic fluid when it contacts a member and further improving light shielding property.

DISCLOSURE OF THE INVENTION

In order to attain the above-mentioned technical subject, the first aspect of the present invention is a light shielding structure, which is provided among a plurality of members arranged spaced a predetermined distance apart to be movable relatively to each other and is capable of preventing light from entering from gaps which are formed among these plurality of members, comprising magnetic force generating means arranged in any one of the above-mentioned plurality of members and magnetic fluid which is magnetically held by this magnetic force generating means and contacts the other member and shielding the gaps which are formed among the above-mentioned plurality of members with the above-mentioned magnetic fluid.

Here, the magnetic force generating means refers to a so-called magnet, and the magnetic fluid refers to fluid in which ferromagnetic particulates are steadily dispersed by causing a surface-active agent to be adsorbed on the surface of the magnetic particulates. Base oil of hydrocarbon, fluorine, silicone or the like mixed with magnetic particulates having a surface-active agent adsorbed there on is used as the magnetic fluid. With these magnetic particulates of a predetermined density, a required light shielding property can be appropriately realized in relation to a thickness dimension in a light shielding direction of the magnetic fluid. Since this magnetic fluid is formed in a shape along a shape of the magnetic lines that are generated from the magnetic force generating means and contacts the other member, light from the outside is shielded. In addition, since the magnetic fluid is held by the magnetic line of force, it keeps a predetermined shape.

In addition, since the above-mentioned other member contacts the magnetic fluid, a sliding resistance can be reduced remarkably compared with a conventional sliding resistance due to a contact among solids. As a result of reducing the sliding resistance in this way, a power consumption that is required for relative movements of two members is reduced and an electric power can be saved.

In addition, even in the case in which a space for installing a light shielding seal varies due to eccentricity of the two members or the case in which there is a flash (parting line) on the parting surface, since the magnetic fluid moves following a magnetic field distribution to fill a gap between two members, eccentric follow-up property is improved and light can be completely shielded.

Moreover, as a result of improving the eccentric follow-up property, it is no more necessary to provide a space equal to or larger than an eccentric quantity on an outer diameter side of a light shielding seal as in the past, saving of a space can be effectively realized, in particular, in a compact camera that is required to be miniaturized.

The second aspect of the present invention is that the above-mentioned magnetic force generating means is formed in a shape that allows magnetic forces to concentrate in the direction to the above-mentioned other member.

Therefore, in the second aspect of the present invention, since magnetic forces are concentrated in the direction to the other member, the magnetic fluid is formed in a shape along magnetic lines of force and maintained by the concentrated magnetic forces, as a result, contacts the other member in a more strongly pressed state.

As a result, even if any one of the members moves relatively to the other member, situation of contacting magnetic fluid being dragged by the moving member can be reduced, whereby the light shielding property can be further improved.

The third aspect of the present invention is that the above-mentioned magnetic force generating means is formed in a point shape protruding in the direction to the other member.

Therefore, in the third aspect of the present invention, if the point shape of the magnetic force generating means is formed to protrude toward the other member, since a surface tension of magnetic fluid 4 and 8 can be formed larger compared with the case in which the tips of the magnetic generating means 2, 3 and 5 are flat, the magnetic fluid 4 and 8 can be held on the magnetic force generating means with a larger holding power. As a result, it becomes possible to shield light more surely.

The fourth aspect of the present invention is that porous materials are disposed in the above-mentioned magnetic force generating means 2, 3 and 5.

Here, for example, woven fabric, nonwoven fabric and the like fall into the category of the porous materials. If such porous materials are disposed, magnetic fluid is more firmly held on the magnetic force generating means by a capillary force of the porous materials in addition to a holding power by a magnetic force, whereby it becomes possible to shield light more surely.

The fifth aspect of the present invention is that the above-mentioned other member is formed of a nonmagnetic material.

According to the fifth aspect of the present invention, if the magnetic fluid takes a shape along magnetic lines of force by a magnetic force from the magnetic force generating means, the magnetic fluid is eventually pressed against the nonmagnetic material.

Therefore, even if an assembling error or the like occurs between one member and the other member, the error can be effectively absorbed.

The sixth aspect of the present invention is that the above-mentioned other member is formed of a magnetic material.

Therefore, according to the sixth aspect of the present invention, since the above-mentioned other member is formed of a magnetic material, not only the magnetic material but also the other member is attracted to the above-mentioned magnetic force generating means by a magnetic force and the magnetic fluid does not take a form of magnetic lines of force but is crushed to be deformed, whereby a contacting area with the other member can be made larger.

As a result, in the sixth aspect of the present invention, a light shielding effect can be further improved.

The seventh aspect of the present invention is that magnetic fluid holding means consisting of a magnetic body are provided on both sides of the above-mentioned magnetic force generating means and the above-mentioned magnetic fluid is magnetically held by the magnetic force generating means and the magnetic fluid holding means.

Therefore, in the seventh aspect of the present invention, since the magnetic fluid is magnetically held not only by a magnetic force generated from the magnetic force generating means but also by the magnetic fluid holding means, the magnetic fluid is held more firmly.

The eighth aspect of the present invention is that the above-mentioned magnetic fluid holding means is formed in a shape that allows magnetic forces to concentrate on the side of the other member.

Therefore, in the eighth aspect of the present invention, since magnetic lines of force concentrate in a part of the magnetic fluid holding means that is positionally closer to the other member, the magnetic fluid takes a shape along the magnetic lines of force and, as a result, an amount of contact of the magnetic fluid to the side of the other member can be increased.

Therefore, in the eighth aspect of the present invention, light can be shielded more surely.

The ninth aspect of the present invention is that the above-mentioned plurality of members are lens barrels of camera lens, and the above-mentioned magnetic force generating means is fixed over the entire circumference of the inside surface portion of the lens barrel on the outer side and the magnetic fluid contacts over the entire circumference of the outside surface portion of the lens barrel on the inner side to shield gaps between the lens barrel on the outer side and the lens barrel on the inner side.

Therefore, in the ninth aspect of the present invention, for example, even if the lens barrel on the inner side moves forward and backward in zooming the camera, since the magnetic fluid that is magnetically held by the magnetic force generating means fixed over the entire circumference of the lens barrel on the outer side is arranged in a state of contacting over the entire surface of the outside surface portion of the lens barrel between the lens barrel on the outer side and the lens barrel on the inner side, light is shielded by the above-mentioned magnetic fluid between the lens barrel on the outer side and the lens barrel on the inner side.

The tenth aspect of the present invention is that the above-mentioned magnetic force generating means and magnetic fluid holding means are fixed in advance to a metal member to be equipped in the end portion of the above-mentioned lens barrels.

Therefore, in the tenth aspect of the present invention, a light shielding structure in which lens barrels are easily manufactured can be provided.

The eleventh aspect of the present invention is that the magnetic force generating means and magnetic fluid holding means are arranged spaced apart from an inner circumference surface portion of the above-mentioned lens barrel on the outer side.

Therefore, in the eleventh aspect of the present invention, since the magnetic force generating means and the magnetic fluid holding means are arranged spaced apart from an attaching section formed in the inner circumference surface portion of the lens barrel on the outer side, a slight gap is formed between the magnetic force generating means and the magnetic fluid holding means and the attaching section formed in the inner circumference surface portion of the lens barrel on the outer side.

As a result, for example, even if axial centers are slightly deviated due to a manufacturing error, an assembling error or the like of lens barrels of a camera lens, the above-mentioned gap portion can absorb the above-mentioned error, whereby it becomes possible to make the axial center of each lens barrel to coincide with each other, that is so-call centering can be performed.

The twelfth aspect of the present invention is that a shielding member that can prevent dusts from entering from the outside is provided on the outer side of the above-mentioned magnetic fluid holding means.

Therefore, in the twelfth aspect of the present invention the claim 12, the above-mentioned shielding member can prevent dusts from entering from the outside. As a result, a situation in which dusts entering from the outside are held between the magnetic fluid holding means and the other member, rubbed against the other member and thus increases a sliding resistance and causes an increase of power consumption of a camera can be prevented.

The thirteenth aspect of the present invention is that a groove of a shape that allows magnetic fluid to be held in the position of the magnetic force generating means by a relative rotational motion of the lens barrel on the inner side and the lens barrel on the outer side is cut on the tip portion of the above-mentioned magnetic force generating means or the above-mentioned magnetic fluid holding means or on the outside surface of the lens barrel on the inner side.

Therefore, even if the other member moves relative to the one member, the magnetic fluid contacting the other member always stays in the position of the magnetic force generating means by the above-mentioned groove without flowing to be attracted by the other member.

As a result, in the thirteenth aspect of the present invention, light can be shielded more surely.

The fourteenth aspect of the present invention is that surface film processing that can secure oil volatilizing property is applied to the surface of the other member that the above-mentioned magnetic fluid contacts.

Here, for example, the case in which an oil volatilizing solid film is formed on the surface of the other member and the case in which oil that is incompatible with the oil forming the magnetic fluid is applied to form an oil film fall into the category of the surface film processing that can secure the oil volatilizing property.

In the case in which such processing is applied to the surface of the other member, even if the magnetic fluid contacts or slidingly contacts the other member, since the magnetic fluid becomes less likely to wet the surface of the lens barrel on the inner side, the magnetic fluid does not easily flow, whereby a light shielding seal can be formed more surely.

BRIEF DESCRIPTION OF THE DRAWINGS

FIG. 12 is an explanatory view showing an eccentric state of the light shielding seal 1 of the conventional art, FIG. 16 is a view showing a configuration in which a magnetic material is held between a plurality of magnets, FIG. 17 is a view showing a configuration in which a protruding portion is formed by a plurality of magnets, FIG. 18 is a view showing a configuration in which a protruding portion is formed by a plurality of magnets.

BEST MODE FOR CARRYING OUT THE INVENTION

Preferred embodiment modes of the present invention will be hereinafter illustratively described in detail with reference to the drawings. However, dimensions, materials and forms of components and their relative arrangement described in these embodiment modes are not intended to limit the scope of the present invention to them unless specifically described otherwise.

[First Embodiment Mode]

Figure 5:
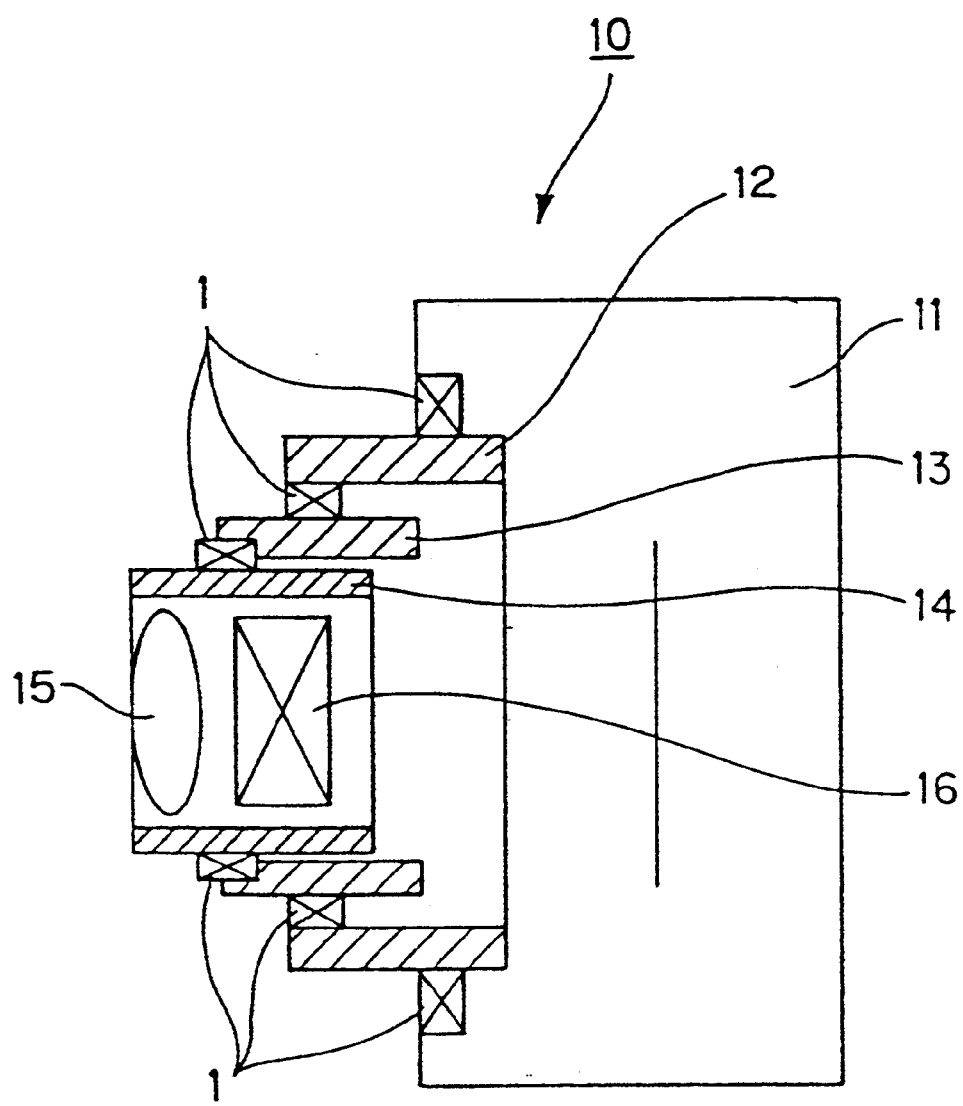
FIG. 5 is an explanatory view showing a compact camera in accordance with the first embodiment mode.

A compact camera will be described as a light shielding device in accordance with a first embodiment mode with reference to FIG. 5. A compact camera 10 schematically shown in FIG. 5 is provided with a zoom lens section having a series of three lens barrels 12, 13 and 14 movably protruding from a camera body 11 and a lens 15 and a shutter unit 16 that are disposed inside the most inner lens barrel 14.

This zoom lens section is provided with light shielding seals 1 in gaps among the lens barrels 12, 13 and 14 and between the lens barrel 12 and the camera body 11, which prevent light and dusts from entering when the zoom lens section moves back and forth in zooming or the like.

Figure 1:
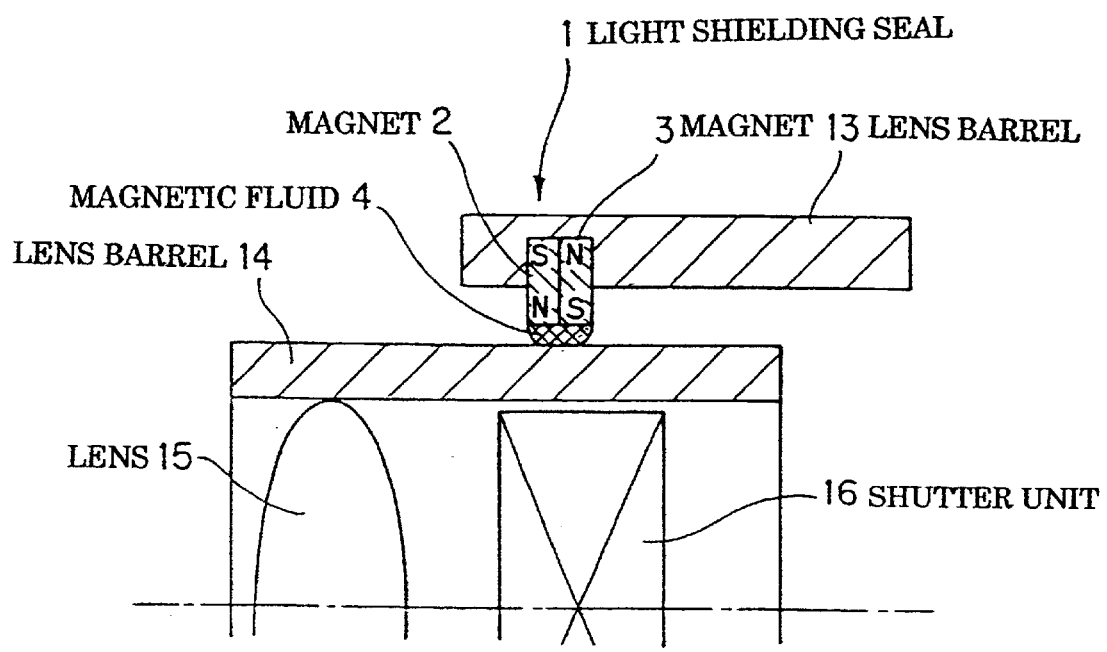
FIG. 1 is a semi-sectional view showing a light shielding seal 1 in accordance with a first embodiment mode.

The light shielding seal 1 inserted in the zoom lens section in accordance with the first embodiment mode is shown in FIG. 1. Any light shielding seal 1 has the same configuration, and the light shielding seal 1 provided between the cylindrical lens barrels 13 and 14 will be described here.

The light shielding seal 1 is composed of a pair of annular magnets 2 and 3 (magnetic force generating means) magnetized with each other in the reverse orientations in the radial direction and disposed on the inner circumference surface of the lens barrel 13 and magnetic fluid 4 held in the inner circumference end portions of the pair of magnets 2 and 3.

The pair of magnets 2 and 3 are joined at both the end surfaces in the axial direction opposing each other of the magnets 2 and 3 magnetized with each other in the reverse orientations in the radial direction, and the magnetic fluid 4 is magnetically held in the inner circumference end portions of the pair of magnets in accordance with a magnetic field distribution between the magnets 2 and 3.

In addition, the pair of magnets 2 and 3 are provided protruding from the inner circumference surface of the lens barrel 13 at a height where the inner circumference end portions do not contact the opposing external circumference surface of the lens barrel 14 even if the lens barrels 13 and 14 are eccentric.

Permanent magnets made of a metal or an organic material filled with magnet powder or the like are used as the magnets 2 and 3.

Particles of $Fe_3O_4$ or the like dispersed colloidally in oil, water, organic solvent or the like are used as the magnetic fluid 4. In this embodiment mode, magnetic fluid of a hydrocarbon base with saturation magnetization of approximately 250 gauss was filled in the light shielding seal 1 such that a thickness dimension in the light shielding direction is approximately 200 $\mu$m, and visible light of 20,000 to 100,000 luxes was irradiated to determine the existence of transmitted light according to whether a photograph film was exposed or not. As a result of this light transmission test, no transmission of light was recognized. In addition, although tests were also conducted using fluorine oil and silicone oil other than the hydrocarbon oil as base oil in which particulates are mixed, results are substantially the same.

Then, when the lens barrel 14 is inserted in the bore of the light shielding seal 1, since the magnetic fluid 4 is fluid, it deforms to match the external circumference surface shape of the solid lens barrel 14 to close the gap between the lens barrels 13 and 14, whereby light can be always shielded and, at the same time, a sliding resistance can be reduced.

Here, if the external circumference surface of the lens barrel 14 is coated by filming processing being applied by a material for improving the oil volatilizing property of the magnetic fluid 4, that is, a material for lowering wettability with the magnetic fluid 4, the power for holding the magnetic fluid 4 is improved. In this case, for example, a solid film having oil volatilizing property may be formed on the surface of the lens barrel, or it is preferable to use a coupling agent having fluoride or a surface reforming agent such as monomer having a fluoride strand that is easily polymerized or the like.

In addition, an oil film may be formed on the surface of the lens barrel by soaking woven or nonwoven fabric as a porous material with fluoride oil and disposing such woven fabric in the front portion of the above-mentioned light shielding seal 1. In this case, brush, felt or the like may be used. In addition, fluid that is incompatible with the magnetic fluid is sufficient as oil for forming such an oil film. For example, since oil of hydrocarbon based and oil of fluoride based are incompatible with each other, oil that is incompatible with the oil used in the light shielding seal 1 is used, whereby oil volatilizing property with respect to the magnetic fluid can be improved and a situation in which the magnetic fluid 4 "wets" the surface of the lens barrel 14 on the inner side can be prevented.

Figure 3:
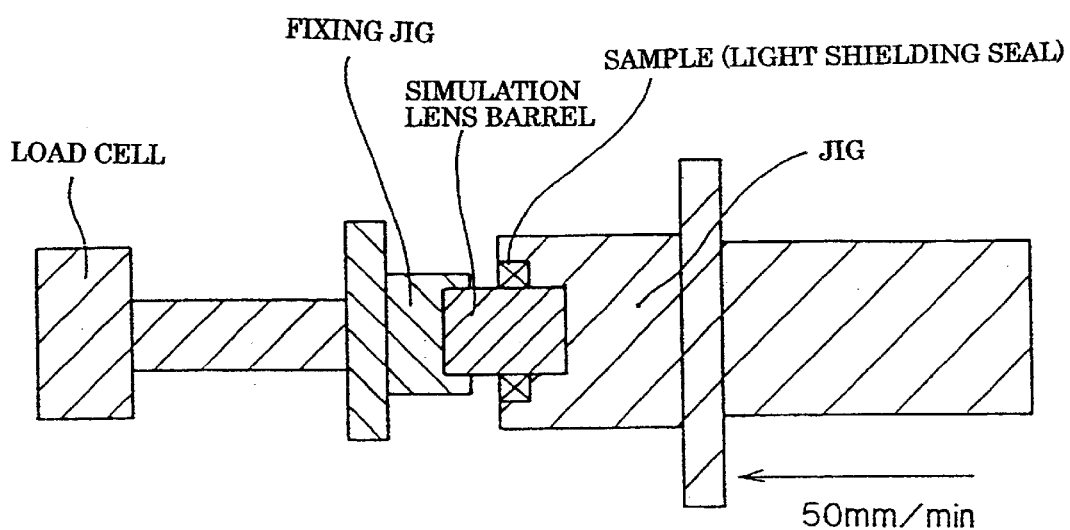
FIG. 3 is an explanatory view showing a state in which a sliding resistance is measured.

A sliding resistance was measured as described below with respect to the first embodiment mode of the above-mentioned configuration. The measurement was performed with the light shielding seal 1 to be a sample inserted in a simulation lens barrel with an outer diameter of φ40 mm as shown in FIG. 3. More specifically, the light shielding seal 1 to be a sample was fixed to a jig and the simulation lens barrel was also fixed to a fixing jig and the fixed jig side of the light shielding seal 1 was slid, whereby the measurement was performed.

A measurement apparatus was the Autograph AG-1000KN manufactured by Shimazu Seisakujo and, as measurement conditions, a sliding direction was the zooming-out direction (without rotation), a sliding speed was 50 mm/min, a sliding distance was 15 mm and a measurement temperature was a room temperature.

Figure 2:
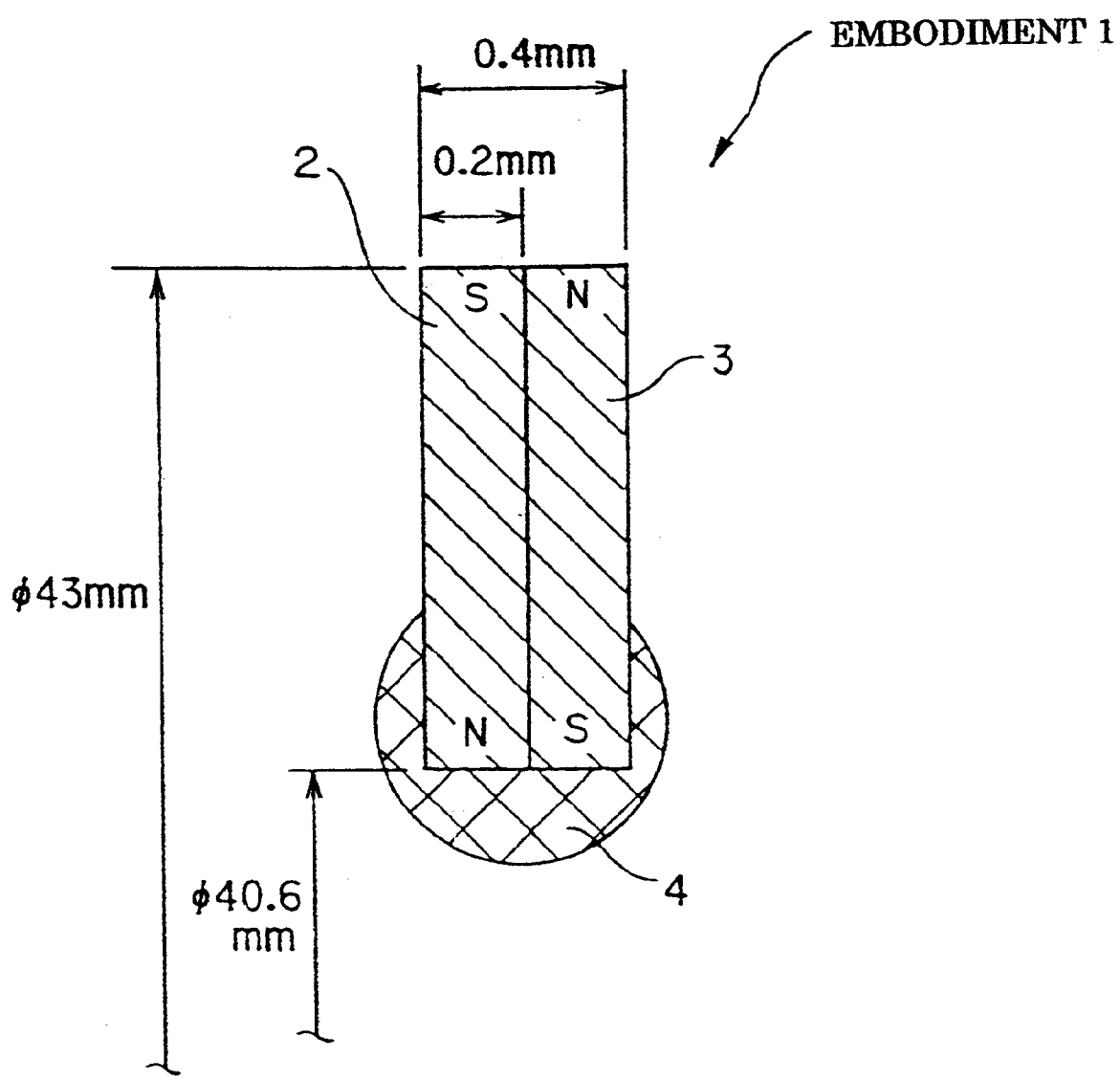
FIG. 2 is a semi-sectional view showing a light shielding seal 1 of a first embodiment in accordance with the first embodiment mode.

A light shielding seal 1 of a first embodiment as a sample in accordance with this embodiment mode is as shown in FIG. 2 and composed of a pair of magnets 2 and 3 formed by joining magnets with an outer diameter of φ43 mm, an inner diameter of φ40.6 mm and a width of 0.2 mm magnetized with each other in the opposite orientations in the radial direction and magnetic fluid 4 that is held in the inner circumference end portions of the pair of magnets 2 and 3.

Figure 4:
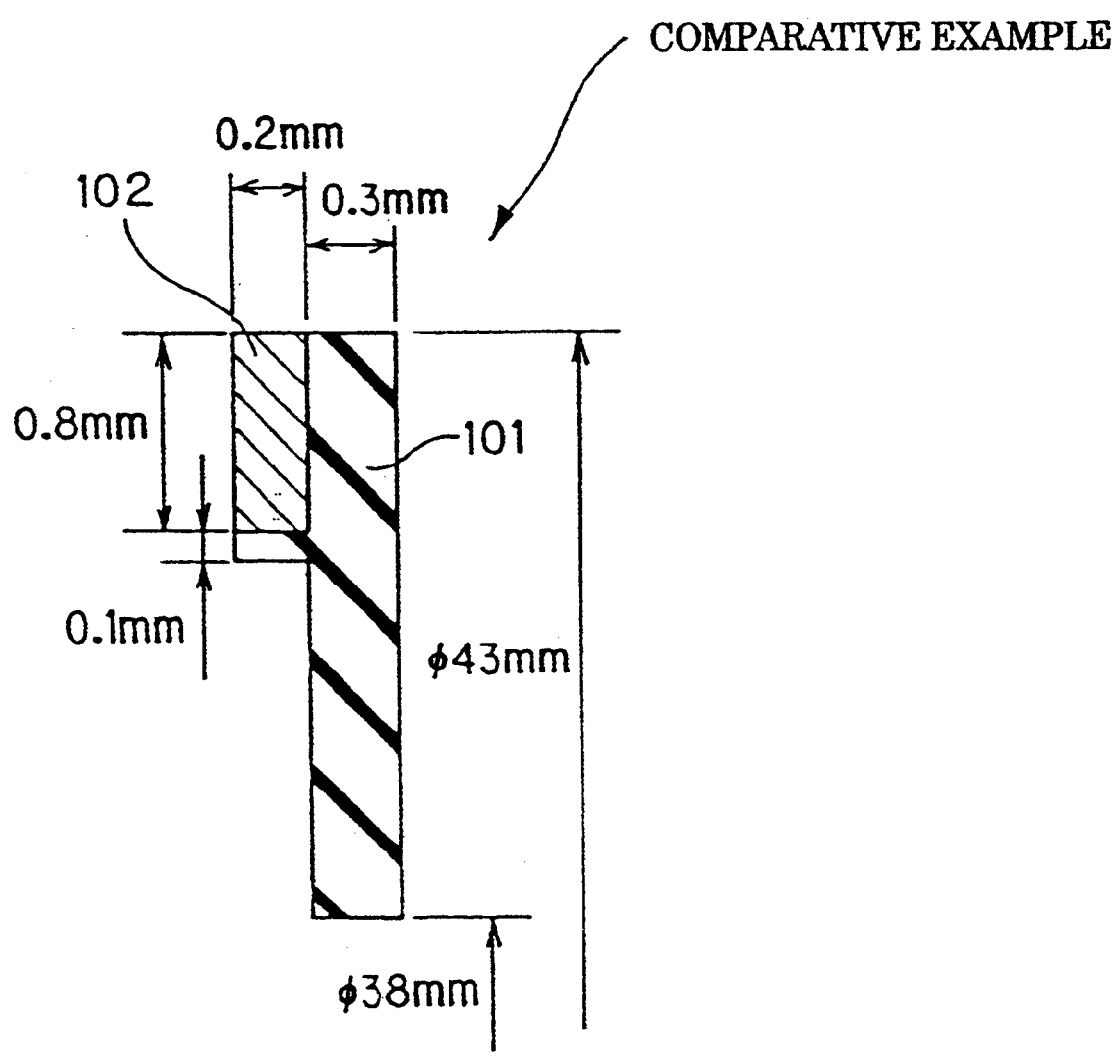
FIG. 4 is a semi-sectional view showing a light shielding seal 1 of a comparative example in accordance with a conventional art.

On the other hand, a light shielding seal 1 of a comparative example as a sample of a prior art is as shown in FIG. 4 and composed of a reinforcing section 102 consisting of a SUS plate with an outer diameter of φ43 mm, an inner diameter of φ41.2 mm and a width of 0.2 mm and a seal lip section 101 consisting of silicone rubber to which the SUS plate is baked and which partly (thickness 0.1 mm) extends to the inner diameter side of the SUS plate and is coated with PTFE with an outer diameter of φ43 mm, an inner diameter of φ38 mm and a width of 0.3 mm.

Results of measuring a sliding resistance using the above-mentioned apparatus with respect to these two samples show that both a starting resistance and a sliding resistance were below a measurement limit 1 gf with the light shielding seal 1 of the embodiment 1 and a starting resistance was 46 gf and a sliding resistance was 30 gf with the light shielding seal 1 of the comparative example.

In this way, the above-mentioned measurement could confirm that the sliding resistance of the light shielding seal 1 of this embodiment mode was remarkably reduced compared with the conventional configuration.

Therefore, the present invention can realize remarkable reduction of the sliding resistance between the light shielding seal and the solid lens barrel 14 by providing the light shielding seal 1 using the magnetic fluid 4 which is fluid.

Thus, in the compact camera, power consumption required in zooming the zoom lens section can be reduced and saving of an electric power can be attained.

In addition, even if the space for installing the light shielding seal 1 varies due to the eccentricity of the lens-barrel 14 or there is a flash (parting line) on a parting surface on the external circumference surface of the lens barrel 14, since the magnetic fluid 4 moves following the magnetic field distribution to fill the gap between the lens barrels 13 and 14, the eccentric follow-up property is improved and light can be completely shielded.

Moreover, as a result of the improved eccentric follow-up property, since it becomes unnecessary to provide the space S that is equal to or larger than an eccentric quantity on an outer diameter of the light shielding seal 1 as in the conventional case, saving of a space can be realized.

Since the light shielding seal 1 of this embodiment mode has a pair of magnetic pole sections provided in the pair of magnets 2 and 3 magnetized and joined in the opposite directions to each other, the light shielding seal 1 is easily configured and excellent in productivity and assembling property.

Figure 6:
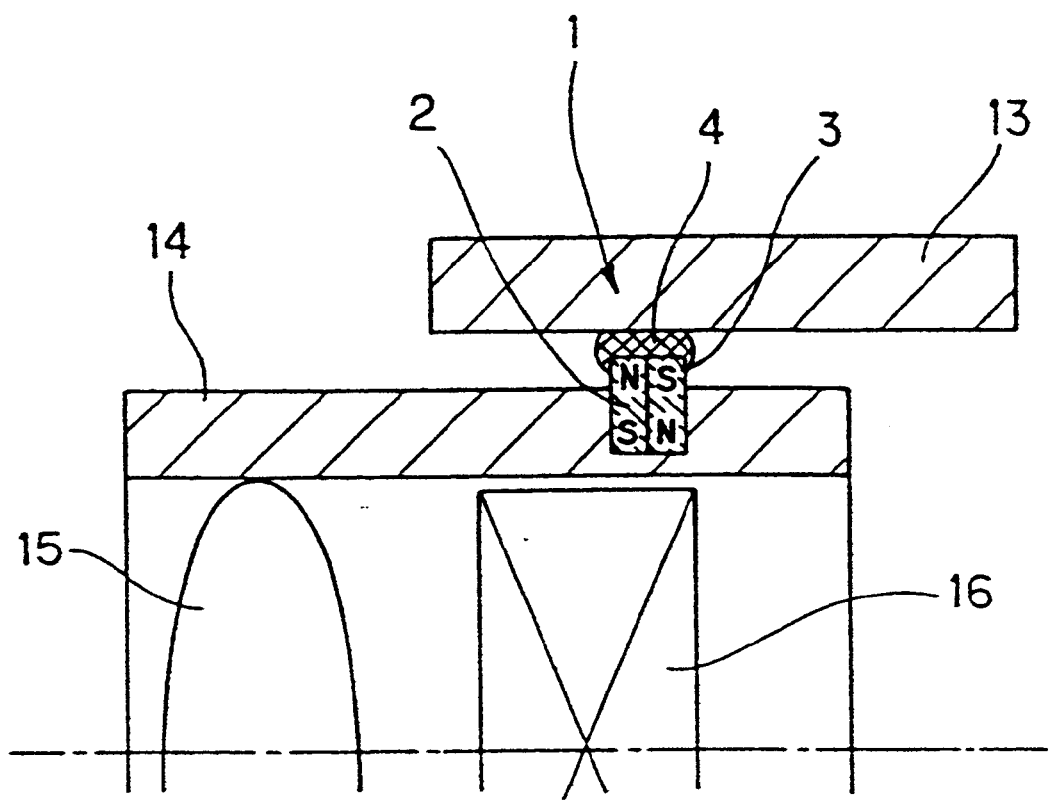
FIG. 6 is a semi-sectional view showing a light shielding seal 1 of another example in accordance with the first embodiment mode.

Further, as shown in FIG. 6, the light shielding seal 1 may be configured to be disposed on the external circumference surface of the lens barrel 14 on the inner side and cause the magnetic fluid 4 and the inner circumference surface of the lens barrel 13 to contact each other to fill the gap between the lens barrels 13 and 14. Moreover, the present invention is not limited with respect to a shape as long as the light shielding seal 1 is configured so as to fill the gap between the lens barrels 13 and 14 by the magnetic fluid 4.

Concerning a shape of a magnet as the magnetic force generating means, the magnet may be formed in any shape that allows magnetic forces to concentrate in the direction of the above-mentioned other member. If the magnet is formed in a shape that allows magnetic forces to concentrate in the direction of the above-mentioned other member in this way, the magnetic fluid 4 is firmly held by the concentrated magnetic forces. As a result, since the magnetic fluid 4 contacts the other member in a state of pressing it more strongly, for example, as mentioned above, even if the lens barrel 13 on the inner side moves with the magnetic fluid 4 contacting it, the magnetic fluid 4 is less likely to be dragged by the sliding resistance of the lens barrel 13 on the inner side and a shape as a light shielding seal is always secured, whereby the light shielding property can be improved.

Figure 13:
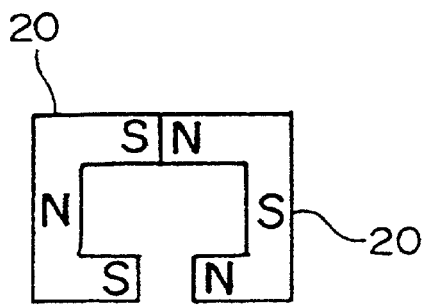
FIG. 13 is a view showing a form of a configuration of a magnet in which tips are formed to be fittingly bent.

That is, for example, as shown in FIG. 13, two magnets 20 themselves can be formed in an L shape, respectively, and arranged such that different magnetic poles oppose each other, whereby a magnetic fluid can be held between the tip portions of the magnets 20 that are fittingly bent.

Figure 14:
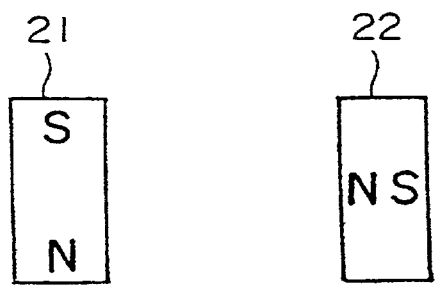
FIG. 14 is a view showing a form of a configuration of a single magnet.
Figure 15:
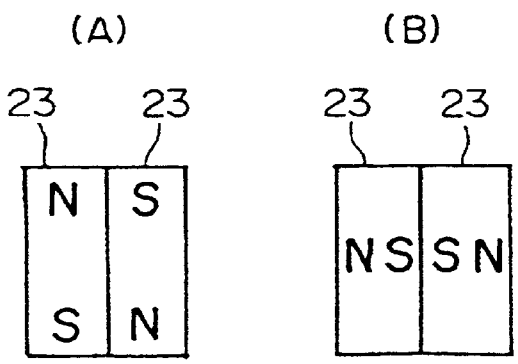
FIG. 15 is a view showing a form of a configuration of a plurality of magnets.

Concerning a configuration of a magnet as the magnetic force generating means, as shown in FIG. 14, the magnet may be a single magnet 2, in this case, a magnet 21 that will have opposite magnetic poles each other in the length direction of a magnet formed in a rectangular shape may be inserted in the radial direction of a lens barrel or a magnet 22 that will have opposite magnet poles in the width direction of a magnet may be inserted in the radial direction of the lens barrel. In addition, as shown in FIGS. 15(A) and (B), there may be a plurality of magnets 23. If the magnetic force generating means is configured by the plurality of magnets 23, 23 in this way, a magnetic force can be increased and, as a result, a power for holding the magnetic fluid can be increased.

Moreover, as shown in FIG. 16, a magnetic material 24 may be held between the pair of magnets 20, 20 on the side of the lens barrel 14 on the inner side in the length direction of the magnets 20 to use the magnets 20 in a part proximate to the lens barrel 14 on the inner side. In this way, if the magnets 20 are configured with the magnetic material 24 held between them, magnetic forces concentrates on the side of the lens barrel 14 on the inner side and the magnetic fluid 4 is pressed more strongly by the lens barrel 14 on the inner side, whereby more effective light shielding processing can be performed.

In addition, the magnet as the above-mentioned magnetic force generating means may be formed in a tip shape protruding in the direction of the other member. That is, as shown in FIG. 1 and FIGS. 17 to 19, for example, if the magnets are fixed on the lens barrel 13 on the outer side, the magnets can also be formed in a shape having a protruding portion 25 protruding in the direction of the lens barrel 14 on the inner side. If such a protruding portion 25 is formed, since magnetic forces can be concentrated in the same manner as described above and, at the same time, a surface tension of the magnetic fluid is formed larger on the tip of the above-mentioned protruding portion 25, the magnetic fluid is held by the magnets as the magnetic force generating means with a larger holding power. As a result, light can be shielded more surely.

In this case, in FIG. 17A, magnetic force generating means is composed of a plurality of magnets 23, 23, which are substantially symmetry on the left and right cross sections in shape, joined with the opposite magnetic poles opposing each other. In FIG. 17B magnetic force generating means is composed of the plurality of magnets 23, 23, which are substantially symmetry on the left and right cross sections in shape, joined with the same magnetic poles opposing each other.

In FIG. 18, magnetic force generating means is composed of plurality of magnets 22, 22, which are asymmetry on the left and right cross sections, joined with the same magnetic poles opposing each other. In this case, if the protruding portion of such asymmetry magnets is disposed in a part toward the inner side of a lens barrel, even if a sliding resistance is generated by the movement of the lens barrel 14 on the inner side, a situation in which the magnetic fluid is dragged by the lens barrel 14 on the inner side to be flown out from the lens barrel-can be reduced.

Figure 19:
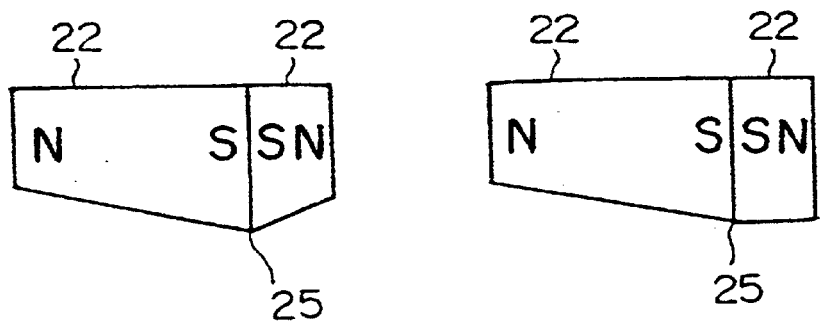
FIG. 19 is a view showing a configuration in which a protruding portion is formed by a plurality of magnets.

In addition, as shown in FIG. 19, magnetic force generating means may be configured such that magnets 22, 22 having the identical shape as those in FIG. 18 can be disposed to have the opposite magnetic poles each other in the axial direction of a lens barrel.

Moreover, as shown in FIGS. 20 to 23, a porous material 26 is fixed to the magnets 23, 23 as the above-mentioned magnetic generating means, whereby magnetic fluid can be held more firmly. Here, for example, woven fabric, non-woven fabric and the like fall into the category of the porous material 26. If the porous material 26 of such woven fabric or the like is disposed in magnets 2 and 3, the magnetic fluid is held on the magnets 2 and 3 as magnetic force generating means by a capillary force of the porous material 26, whereby it becomes possible to shield light surely.

Figure 20:
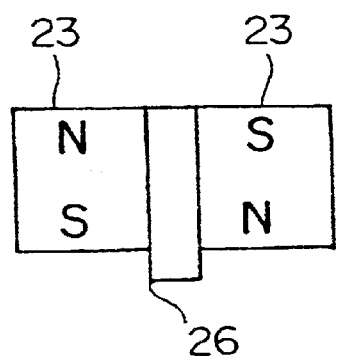
FIG. 20 is a view showing a magnet formed by holding a porous material by a plurality of magnets.
Figure 21:
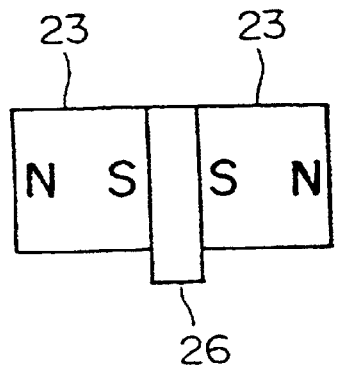
FIG. 21 is a view showing a magnet formed by holding a porous material by a plurality of magnets.
Figure 22:
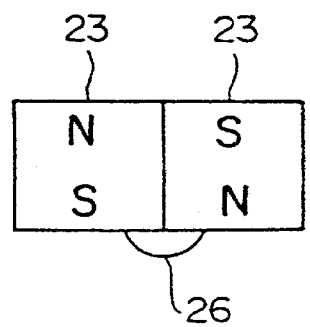
FIG. 22 is a view showing a magnet formed by fixing a porous material in the center of a plurality of magnets.
Figure 23:
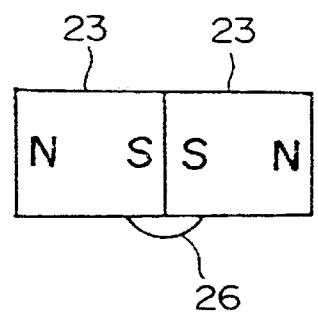
FIG. 23 is a view showing a magnet formed by fixing a porous material in the center of a plurality of magnets.

In FIG. 20, the porous material 26 is held between the pair of magnets 2 and 3 disposed to have opposite magnetic poles each other in the radial direction of a lens barrel. In addition, in FIG. 21, the porous material 26 is held between the pair of magnets 2 and 3 disposed to have opposite magnetic poles each other in the axial direction of the lens barrel. Moreover, in FIG. 22, the porous material 26 is fixed on the side of the lens barrel section on the inner side in the center of the pair of magnets 2 and 3 disposed to have opposite magnetic poles each other in the radial direction of the lens barrel. In FIG. 23, the porous material 26 is fixed on the side of the lens barrel section on the inner side in the center of the pair of magnets 2 and 3 disposed to have opposite magnetic poles each other in the axial direction of the lens barrel.

[Second Embodiment Mode]

Figure 7:
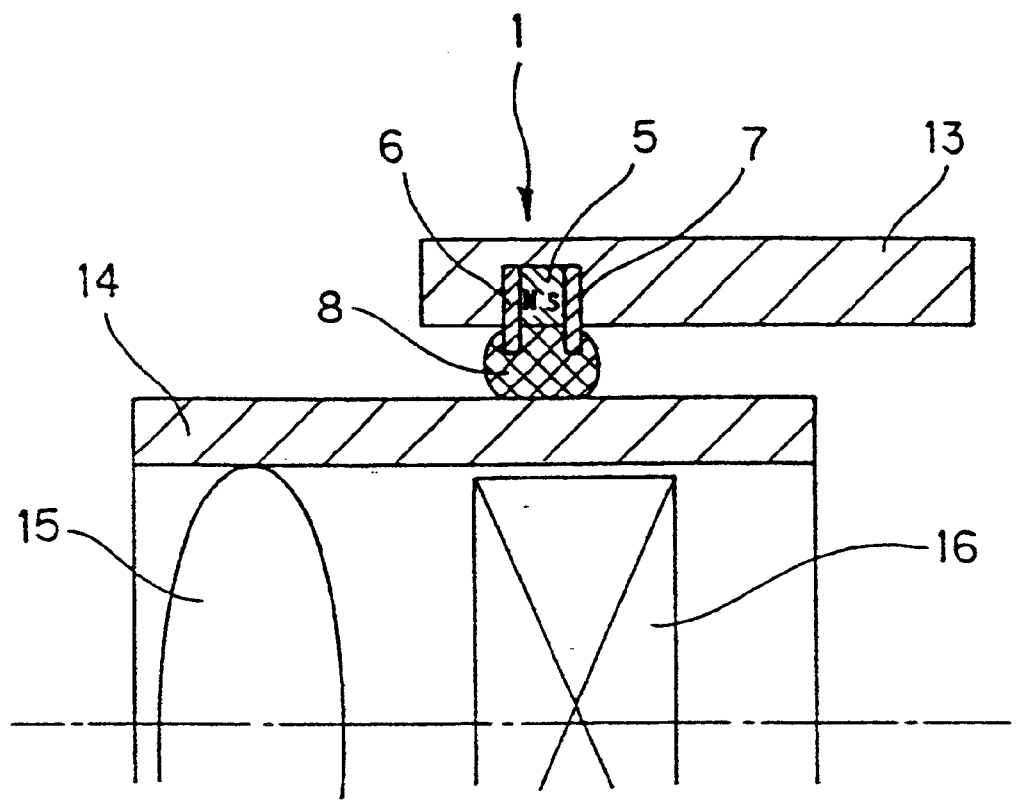
FIG. 7 is a semi-sectional view showing a light shielding seal 1 in accordance with a second embodiment mode.

FIG. 7 shows a second embodiment mode. The light shielding seal 1 is composed of an annular magnet 5 (magnetic force generating means) magnetized in the axial direction, a pair of annular pole pieces 6 and 7 consisting of magnetic bodies fixed to both sides in the axial direction of this magnet 5, and magnetic fluid 8 held between the pair of pole pieces 6 and 7.

Here, the light shielding seal 1 in accordance with the second embodiment mode will be described, and the components same as those in the first embodiment mode are denoted by the same reference numerals and descriptions of such components are omitted.

A magnetic circuit is composed of a magnet 5, a pole piece 7, a magnetic fluid 8 and a pole piece 6, and the magnetic fluid 8 is magnetically held by the magnetic field distribution of this magnetic circuit.

The pair of pole pieces 6 and 7 is set in the lens barrel 13 holding the magnet 5 and protrudes on the inner circumference surface of the lens barrel 13. The height of the portions of these pole pieces 6 and 7 protruding on the inner circumference surface of the lens barrel 13 is set such that the inner circumference end portion does not contact the opposing external circumference surface of the lens barrel 14 even if the lens barrel 13 is eccentric.

As the magnet 5, one made of a metal, an organic material filled with magnet powder, an electromagnet or the like is used.

As the pole pieces 6 and 7, those made of a metal, an organic material filled with magnetic metal powder or the like are used.

When the lens barrel 14 is inserted in the bore of the light shielding seal 1, since the magnetic fluid 8 is fluid, it deforms to conform to the shape of the external circumference surface of the solid lens barrel 14 and closes the gap between the lens barrels 13 and 14, whereby it can always shield light and reduce a sliding resistance at the same time.

A sliding resistance was measured as described below with respect to the second embodiment mode of the above-mentioned configuration. As in the first embodiment mode, the measurement was performed with the light shielding seal 1 to be a sample inserted in a simulation lens barrel with an outer diameter of ϕ40 mm as shown in FIG. 3.

Figure 8:
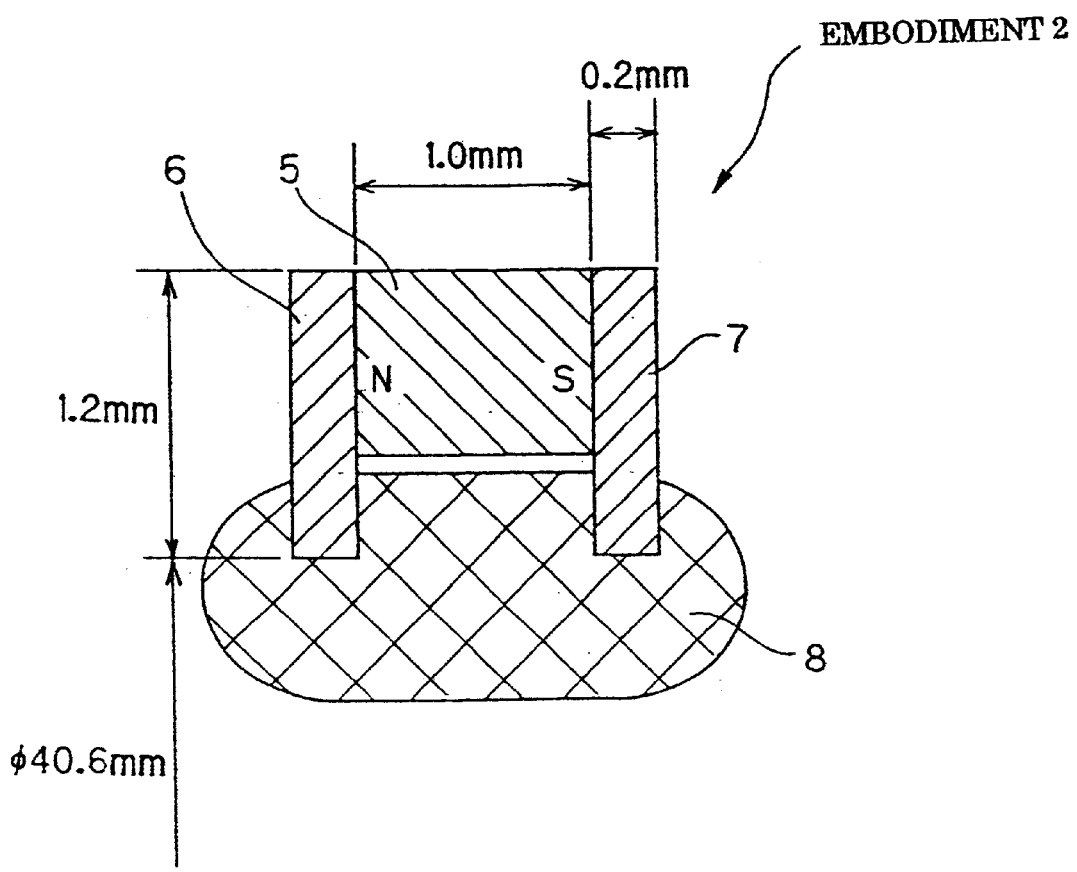
FIG. 8 is a semi-sectional view showing a light shielding seal 1 of a second embodiment in accordance with the second embodiment mode.

A light shielding seal 1 of a second embodiment as a sample in accordance with this embodiment mode is as shown in FIG. 8 and composed of the pair of pole pieces 6 and 7 with an outer diameter of ϕ41.8 mm, an inner diameter of ϕ40.6 mm and a width of 0.2 mm, the permanent magnet 5 with a width of 1.0 mm magnetized in the axial direction and held between the pair of pole pieces 6 and 7 and the magnetic fluid 8 that is held between the inner circumference end portions of the pair of pole pieces 6 and 7.

Results of measuring a sliding resistance with respect to this sample are described below. With the light shielding seal 1 of the embodiment 2, both a starting resistance and a sliding resistance were below a measurement limit 1 gf as the light shield seal 1 in the embodiment 1 of the first embodiment mode.

In this way, the above-mentioned measurement could confirm that the sliding resistance of the light shielding seal 1 was also remarkably reduced compared with the conventional configuration in this embodiment mode. Therefore, the same effects as in the first embodiment mode can be obtained.

Further, the external circumference surface of the lens barrel 14 contacting the magnetic fluid 8 may be formed of a magnetic body as well to hold the magnetic fluid 8 between each of the pole pieces 6 and 7 and the external circumference surface of the lens barrel 14.

Figure 9:
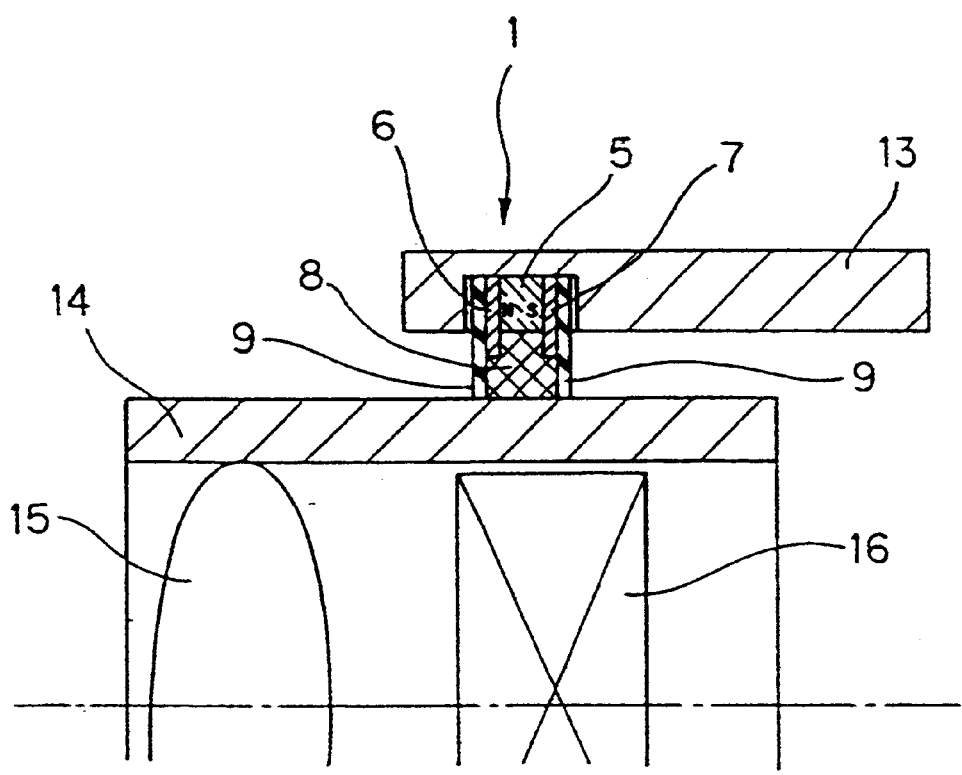
FIG. 9 is a semi-sectional view showing a light shielding seal 1 of another example in accordance with the second embodiment mode.

In addition, as shown in FIG. 9, the light shielding seal 1 can also be configured with seal lip sections 9, which are made of silicon rubber or the like as in the conventional case, provided on both sides (or one side) of the pole pieces 6 and 7. These seal lip sections 9 of FIG. 9 are configured to contact their tip lightly on the external circumference surface of the lens barrel 14 such that they do not prevent the contact between the magnetic fluid 8 and the external circumference surface of the lens barrel 14.

According to this configuration of FIG. 9, since the seal lip sections can surely prevent leakage of the magnetic fluid 8 following relative movement, the sealing property of the light shielding seal 1 can be improved.

Figure 10:
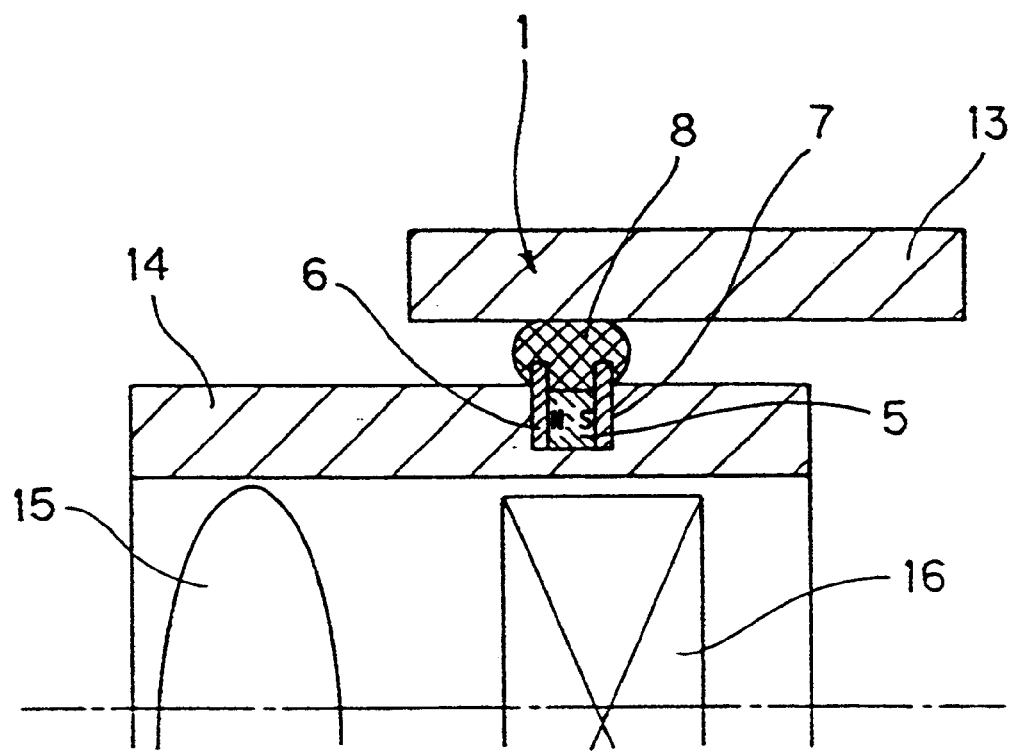
FIG. 10 is a semi-sectional view showing a light shielding seal 1 of another example of the second embodiment mode.
Figure 11:
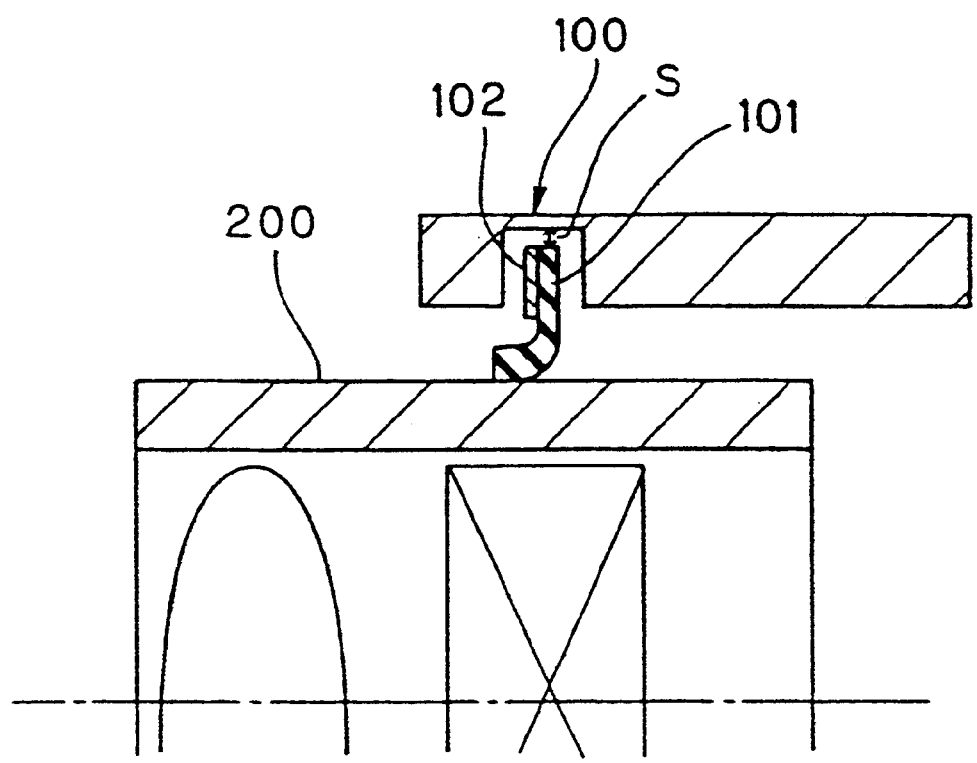
FIG. 11 is a semi-sectional view showing a light shielding seal 1 of a conventional art.

Moreover, as shown in FIG. 10, the light shielding seal 1 may be disposed on the external circumference surface of the lens barrel 14 on the inner side to cause the magnetic fluid 8 and the inner circumference surface of the lens barrel 13 to contact each other and fill the gap between the lens barrels 13 and 14.

In addition, the pole pieces as the above-mentioned magnetic fluid holding means may be formed in a shape that allows magnetic fluxes to concentrate on the other member side. If the pole pieces are formed in such a shape, since the magnetic lines of force concentrate in a part of the magnetic fluid holding means positionally closer to the lens barrel on the inner side, the magnetic fluid is also formed in a shape along the magnetic lines of forces to function as a seal material and, as a result, an amount of contact of the magnetic fluid to the other member side can be further increased. As a result, light can be shielded more surely.

Figure 24:
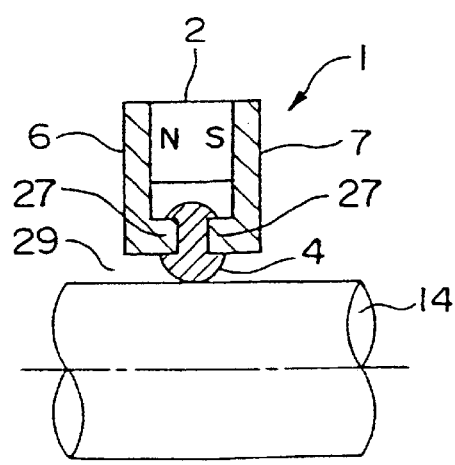
FIG. 24 is a view showing an embodiment mode in which tip portions of a pole piece are formed to be fittingly bent.

That is, as shown in FIG. 24, the tip shape of the above-mentioned pole pieces 6 and 7 may be configured such that tip sides 27, 27 of the pole pieces 6 and 7 are formed to be fittingly bent in an L shape to the inside and the magnetic fluid 4 is held between this pair of tip portion 27, 27. If the tip sides 27, 27 of the pole pieces 6 and 7 are formed in an L shape in this way, magnetic forces are concentrated in the tip portions 27, 27 and the magnetic fluid 4 held by the pair of tip portions 27, 27 is also held more surely.

Figure 25:
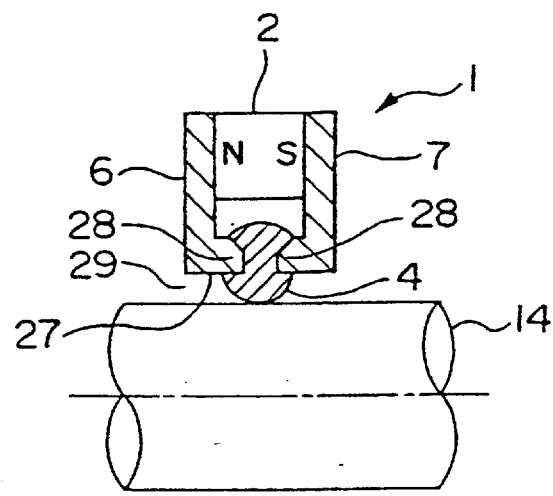
FIG. 25 is a view showing an embodiment mode of a state in which tip portions of a pole piece are formed to be fittingly bent and the tip portions are notched.
Figure 27:
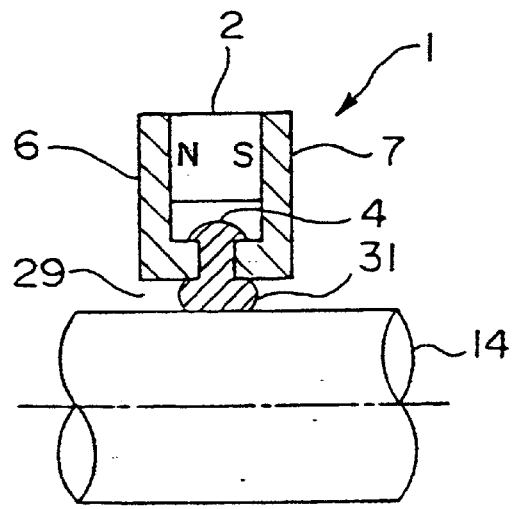
FIG. 27 is a view showing a state in which magnetic fluid contacts a magnetic material.
Figure 28:
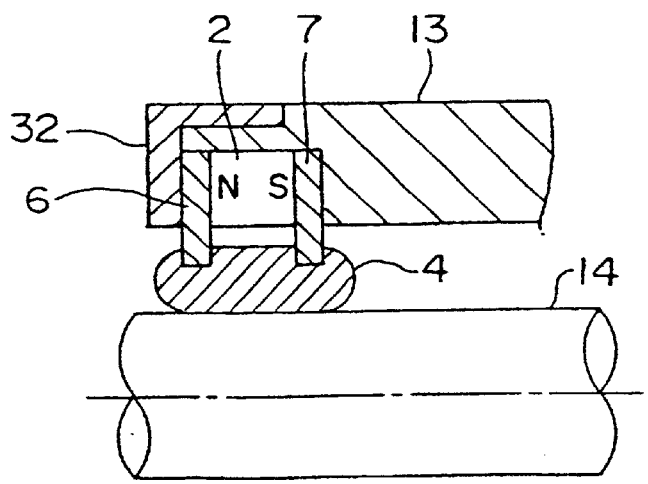
FIG. 28 is a view showing a case in which a light shielding seal is fixed in advance in a ring member of a tip portion of a lens barrel.

Moreover, as shown in FIG. 25, if the above-mentioned pair of tip portions 27, 27 are cut on the lens barrel side on the outer side and tip edges 28, 28 are formed on the lens barrel side on the inner side, since magnetic lines of force are generated more in the lens barrel direction on the inner side than in the above-mentioned case of FIG. 27 and the magnetic fluid 4 is formed along the magnetic lines of force to function as a seal material, thereby the magnetic fluid 4 contacts the lens barrel 14 on the more inner side more than the case of FIG. 24. Therefore, the light shielding seal 1 can shield the gap 29 between the lens barrel 14 on the inner side and the lens barrel 13 on the outer side in an area larger than the case of FIG. 24.

Figure 26:
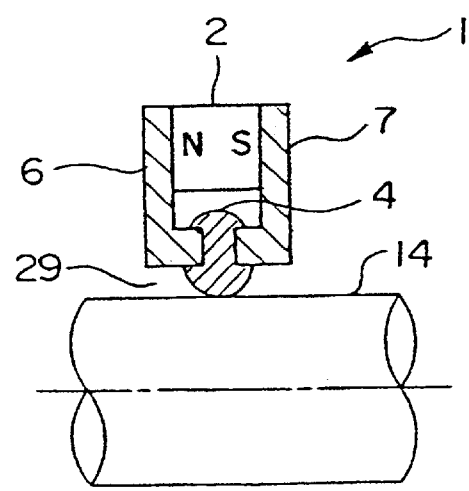
FIG. 26 is a view showing a state in which magnetic fluid contacts a nonmagnetic material.

In addition, as shown in FIG. 26, if the lens barrel 14 on the inner side is formed of a nonmagnetic material 30, an automatic aligning function or an eccentric follow-up function can be obtained by using the light shielding structure in accordance with this embodiment mode.

That is, if the main body of the lens barrel 14 on the inner side is formed by resin molding, the magnetic fluid 4 is formed in a shape according to magnetic lines of force by a magnetic force generated by the magnet 2. In this case, since the lens barrel 14 on the inner side is formed of a nonmagnetic material, the lens barrel 14 on the inner side is never attracted to the light shielding seal 1. Therefore, when the magnetic fluid 4 is formed in a shape according to magnetic lines of force, a pressing force acts toward the lens barrel 14 on the inner side from the magnetic fluid 4. This force is caused by a force of the magnetic fluid 4 orienting to the magnetic lines of force.

In this case, since the light shielding seal 1 is disposed over the entire inner surface portion of the lens barrel 13 on the outer side, the above-mentioned pressing force toward the axial center acts on the entire circumference surface direction of the lens barrel 14 on the inner side. Therefore, the pressing force acts toward the axial center of the lens barrel 14 on the inner side from all the directions, whereby eccentricity can be corrected even if deviation of the axial center of the lens barrel 14 on the inner side occurs.

On the other hand, if the lens barrel 14 on the inner side is formed by a magnetic material, the magnetic fluid is formed along magnetic lines of force by the magnetic force of the magnet 2 to functions a seal material as shown in FIG. 27. At this point, the lens barrel 14 on the inner side itself is also attracted simultaneously in the direction of the magnetic force generating means by the magnetic force of the magnetic force generating means. As a result, since the outer side surface portion of the lens barrel 14 on the inner side slightly presses the magnetic fluid, the part of the magnetic fluid contacting the lens barrel 14 on the inner side is crushed to be deformed, whereby the contacting part with the lens barrel 14 on the inner side is enlarged. Therefore, the contacting area of the magnetic fluid 4 with the lens barrel 14 on the inner side in the axial direction of the lens barrel 14 on the inner side is also enlarged compared with the case of FIG. 26, whereby light can be shielded more surely.

Further, the light shielding seal 1 provided with such magnetic force generating means and magnetic fluid holding means may be fixed in advance to a metal member 32 that is inserted in the end portion of the lens barrel 14 on the outer side as shown in FIGS. 28 to 31.

In this embodiment mode, the light shielding seal 1 configured with the pair of pole pieces 6 and 7 fixed on both sides of the magnet and the magnetic fluid 4 held by the pole pieces 6 and 7 is fixed on the inner circumference surface portion of the metal ring member 32 formed in an L shape in the cross section that is fixed to the tip portion of the lens barrel 13 on the outer side. That is, in FIG. 28, only the side portion of the one pole piece 6 is fixed to the radial direction portion of the above-mentioned ring member 32.

Therefore, when the lens barrel 13 on the outer side is manufactured, the ring member 32 having the light shielding seal 1 configured in this way in advance fixed thereon is attached and fixed, for example, as an integral part to the lens barrel main body of synthetic resin.

In the embodiment mode configured in this way, it is sufficient to attach and fix the ring member 32 attached in advance the light shielding seal 1 as the integral part to the lens barrel integrally formed of synthetic resin, whereby a light shielding structure that is easily attached can be provided.

Figure 29:
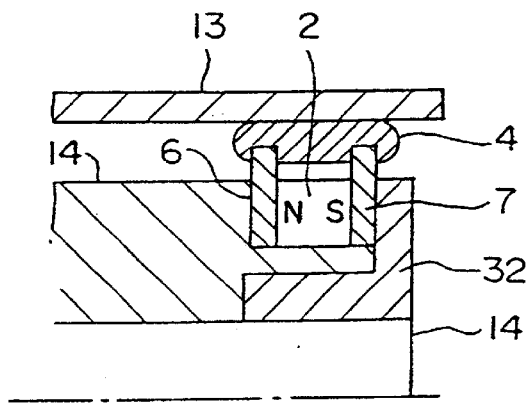
FIG. 29 is a view showing a case in which a light shielding seal is fixed in advance in a ring member of a tip portion of a lens barrel.
Figure 30:
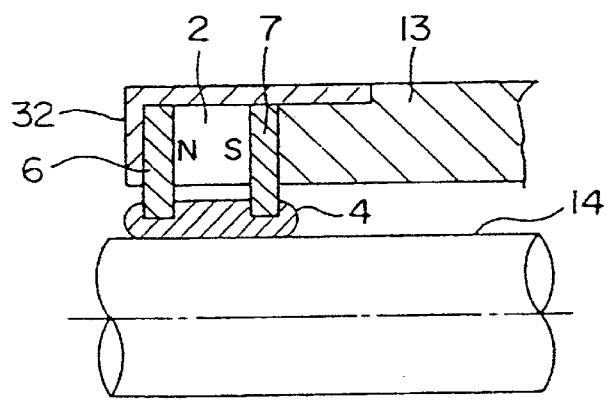
FIG. 30 is a view showing a case in which a light shielding seal is fixed in advance in a ring member of a rear end portion of a lens barrel.
Figure 31:
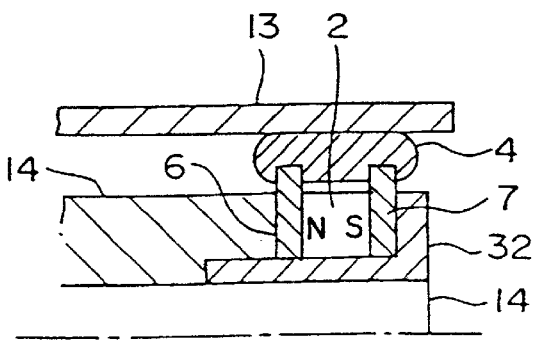
FIG. 31 is a view showing a case in which a light shielding seal is fixed in advance in a ring member of a rear end portion of a lens barrel.

If such a light shielding seal 1 is fixed to the ring member 32 that is a component of the lens barrel in advance, the ring member 32 is not limited to the above-mentioned embodiment modes, but the side portion of the one pole piece 6, the magnet 2 and the entirety of the other pole piece 7 may be fixed to the ring member 32 as shown in FIG. 30. In addition, as shown in FIGS. 29 and 31, the light shielding seal 1 may be fixed to the ring member 32 on the rear end portion side of the lens barrel 14 on the inner side and the magnetic fluid 2 may contact the inner side portion of the lens barrel 13 on the outer side.

Further, although the above-mentioned embodiment modes are described with the case in which the light shielding seal 1 is fixed to the ring member 32 in advance as an example, the light shielding seal 1 is not limited to the above-mentioned embodiment modes but may be, for example, integrally assembled in the lens barrel 13 made of resin on the outer side.

Moreover, such a light shielding seal 1 may not be fixed to the above-mentioned lens barrel. That is, as shown in FIGS. 32 and 33, in this embodiment mode, the light shielding seal 1 consisting of the magnet 2 and the pole pieces 6 and 7 is disposed spaced apart from an inner circumference surface portion 33 of the above-mentioned lens barrel 13 on the outer side.

Figure 32:
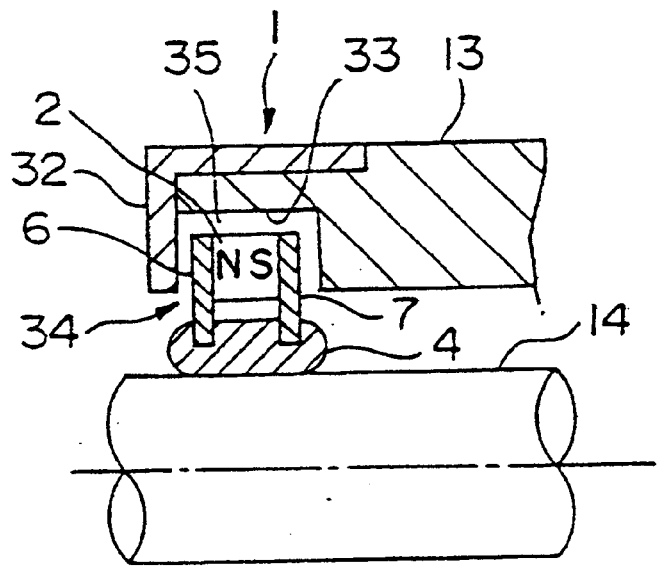
FIG. 32 is a view showing a case in which a light shielding seal is attached to a lens barrel in a floating state.
Figure 33:
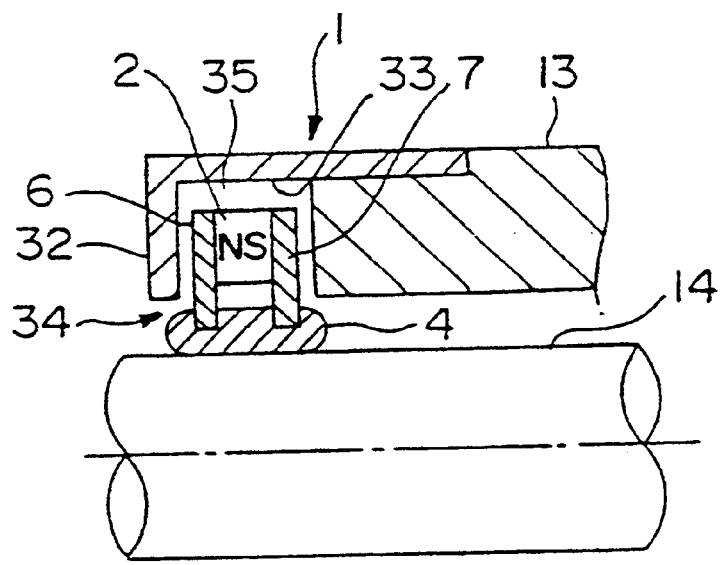
FIG. 33 is a view showing a case in which a light shielding seal is attached to a lens barrel in a floating state.

In the embodiment mode shown in FIG. 32, an attaching section 34 for the light shielding seal 1 consisting of a recessed portion is formed in the tip portion of the lens barrel 13 on the outer side which is made of synthetic resin, and the light shielding seal 1 is disposed with a slight gap 35 formed between the bottom portion of the attaching section 34 for the light shielding seal 1. In addition, in FIG. 33, the light shielding seal 1 is disposed with the slight gap 35 formed between the inner circumference surface portion of the ring member 32 fixed to the tip portion of the lens barrel 13 on the outer side.

In this case, the above-mentioned gap is in the order of 0.1 mm. If the light shielding seal 1 is disposed with such a gap 35, even if an axial center is slightly deviated due to a manufacturing error of a lens barrel, an assembling error or the like, the error of the axial center can be absorbed by the above-mentioned gap, so that the automatic aligning function can be retained and the centering can be easily performed. In addition, as described above, since the above-mentioned gap 35 is in the order of 0.1 mm and formed very small, even if the light shielding seal 1 is inserted with such a gap 35, no specific deficiency such as wobbling or the like is caused at the time when the lens barrel moves or the like.

Figure 34:
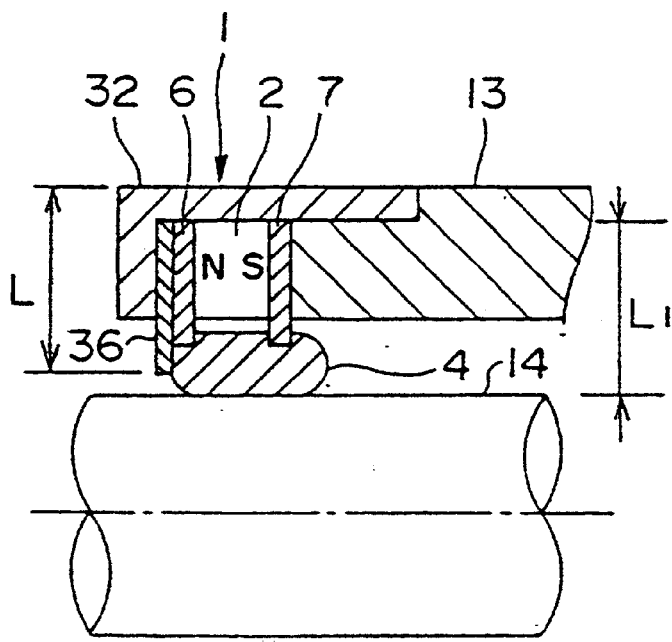
FIG. 34 is a view showing a case in which a shielding member is attached to a light shielding seal.
Figure 35:
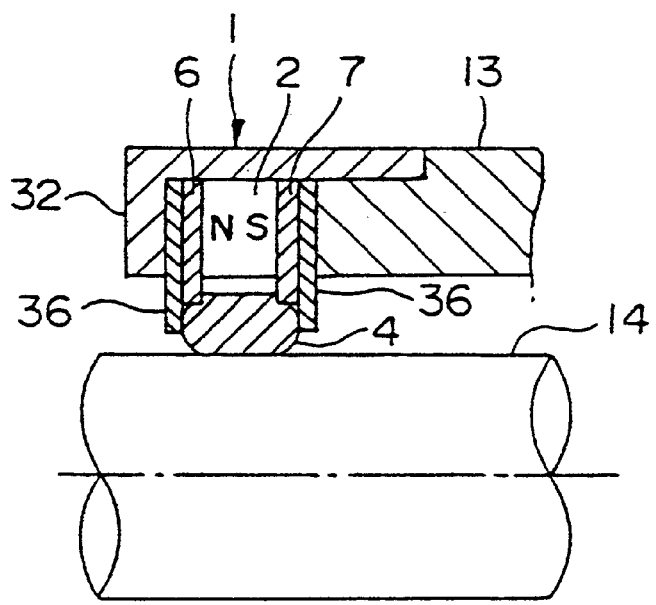
FIG. 35 is a view showing a case in which a shielding member is attached to a light shielding seal.

Moreover, as shown in FIGS. 34 and 35, a shielding member 36 capable of preventing dusts from entering from the outside may be provided on the outer side of the light shielding seal 1. As shown in FIGS. 34 and 35, in this embodiment mode, the shielding member 36 capable of preventing dusts from entering from the outside is provided between the pole piece 6 on the outer side which is fixed on the side of the magnet 2 and the ring member 32. A width dimension L of this shielding member 36 is formed larger than a width dimension of the pole piece and smaller than an interval dimension L1 from the base end portion of the pole piece to the lens barrel on the inner side. As a material of this shielding member 36, for example, felt, rubber, Mylar, PTFE, sponge and the like are suitable.

Therefore, in this embodiment mode, since the above-mentioned shielding member 36 is provided, the above-mentioned shielding member 36 can prevent dusts from entering from the outside. As a result, a situation in which dusts entering from the outside are held between the pole pieces 6 and 7 and the lens barrel 14 on the inner side, rubbed when the lens barrel 14 on the inner side moves to increase a sliding resistance and an increase of power consumption of a camera is caused can be prevented.

This shielding member 36 is particularly effective for dusts of a magnetic material. That is, even if such a shielding member 36 is not used, it is possible to prevent dusts of a nonmagnetic material from entering the inside of the lens barrel because the dusts of a nonmagnetic material are removed by a magnetic force of a magnet, but it is likely that dusts of a magnetic material enter the inside of the lens barrel by a magnetic force of a magnet and are attracted to the pole pieces 6 and 7 in the magnetic fluid 4 to be rubbed against the surface portion of the lens barrel. However, if the above-mentioned shielding member 36 is provided, it is possible to effectively prevent the above-mentioned dusts of a magnetic material from entering.

Moreover, although this embodiment mode is described with the case in which the shielding member 36 is disposed only on the side of the lens barrel on the inner side of the magnet 2 as an example as shown in FIG. 34, the shielding member 36 is not limited to this embodiment mode but, for example, the shielding member 36 may be provided on the pole piece 7 side on the inner side of the magnet 2 as shown in FIG. 35.

Figure 36:
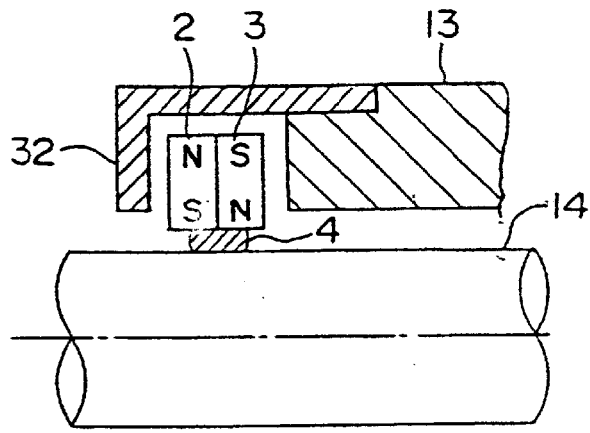
FIG. 36 is a view showing a general light shielding structure utilizing magnetic fluid.
Figure 37:
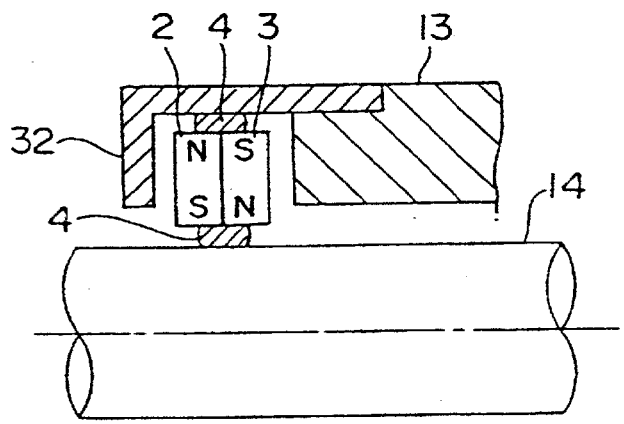
FIG. 37 is a view showing a case in which magnetic fluid is provided in both of a plurality of members of a magnet.

In addition, although the above-mentioned each embodiment mode is described with the case in which the magnetic fluid 4 is disposed between the magnets 2 and 3 and the lens barrel 14 on the inner side as an example as shown in FIG. 36, the magnetic fluid 4 is not limited to the above-mentioned embodiment modes but may also be disposed between the magnets 2 and 3 and the ring member 32 fixed to the tip portion of the lens barrel 13 on the outer side as shown in FIG. 37.

In this way, if the magnetic fluid 4 is disposed both between the magnets 2 and 3 and the lens barrel 14 on the inner side and between the magnets 2 and 3 and the ring member 32, the magnetic fluid 4, 4 in the both places is formed in a shape that conforms to magnetic lines of force by a magnetic force to function as a light shielding seal material. In addition, in the case of this embodiment mode, the magnets 2 and 3 forming the light shielding seal 1 is assembled in a floating state with the lens barrel 13 on the outer side by a magnetic levitation.

As a result, in the case of the above-mentioned other embodiment mode, a slight gap may be formed between the light shielding seal 1 and the lens barrel 13 on the outer side due to an error in attaching the light shielding seal 1 to the lens barrel 13 on the outer side, or the like, and it is possible that light enters from such a gap. In this embodiment mode, however, since the space between the light shielding seal 1 and the members forming the lens barrel 13 on the outer side is also shielded by the magnetic fluid 4, external light can be shielded more completely. In addition, since the magnetic fluid 4, 4 is disposed in two places in the direction perpendicular to the axial center, if the axial center of the lens barrel deviates, the light shielding seal can follow larger deviation of the axial center sufficiently compared with the case in which the magnetic fluid exists only in one place in the direction perpendicular to the axial center.

Figure 38:
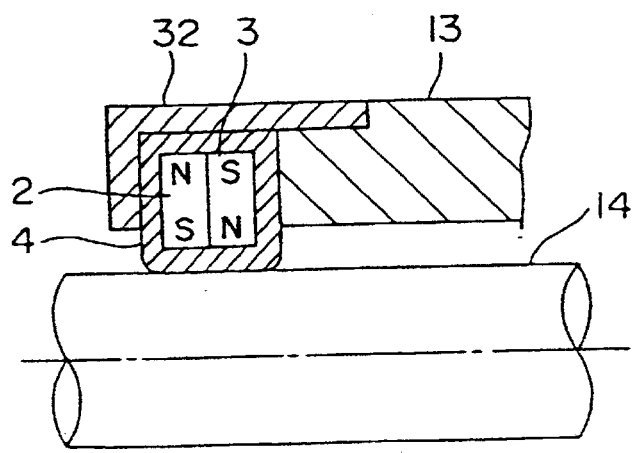
FIG. 38 is a view showing a case in which magnetic fluid is provided to cover an entire magnet.

In addition, as shown in FIG. 38, the magnetic fluid 4 can be disposed over the entire circumference surface such that the magnetic fluid 4 surrounds the magnets 2 and 3. In this case, since the magnetic lines of force of the magnets 2 and 3 are also formed in the axial direction of the lens barrel of the magnets, the magnetic fluid 4 is magnetized according to a shape of the magnetic lines of force of the magnets 2 and 3 to function as a light shielding seal member in a form surrounding the magnets 2 and 3.

When configured as described above, since the magnetic fluid 4 functions as a light shielding seal material also in the axial direction of the lens barrel of the magnets 2 and 3, it is possible to prevent the magnets 2 and 3 from directly contacting a side wall portion 37 of the attaching section for the light shielding seal 1 provided in the lens barrel.

Figure 39:
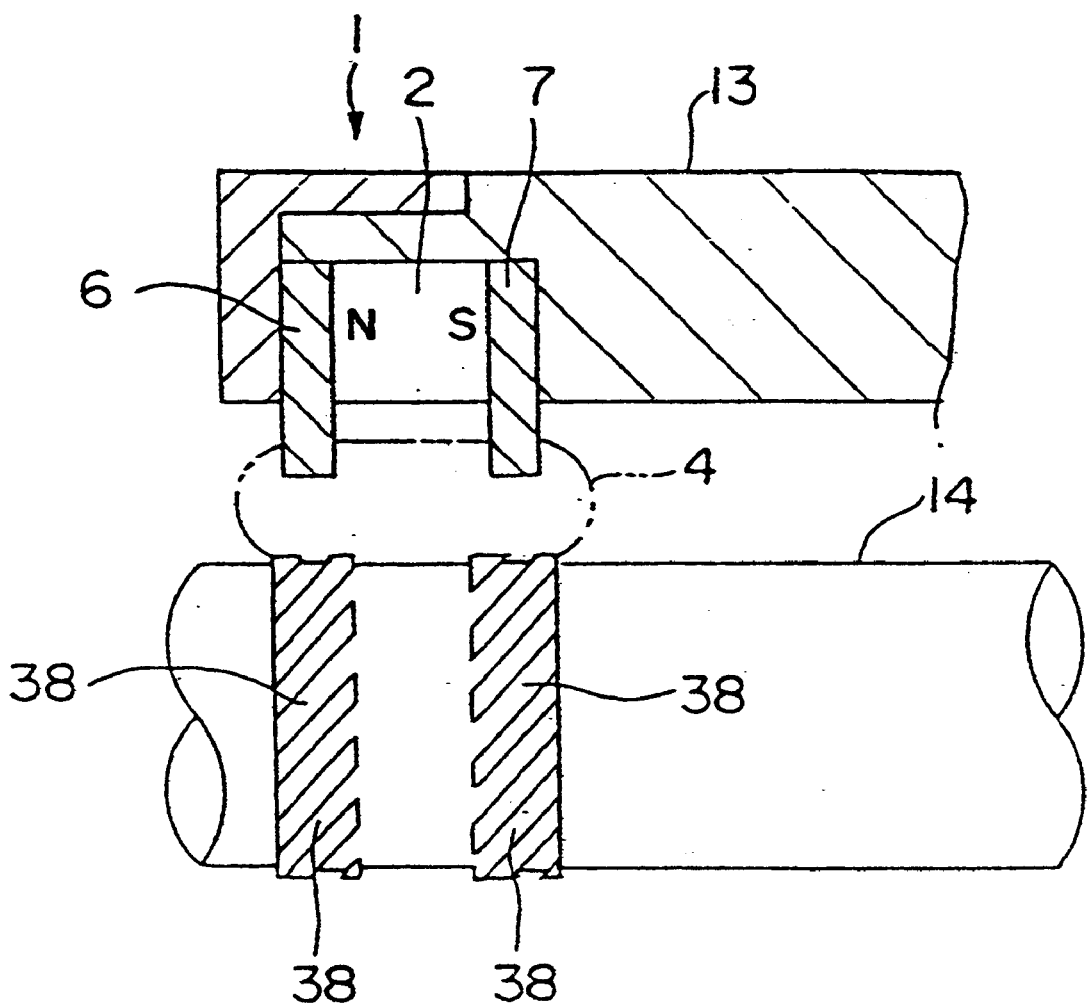
FIG. 39 is a view showing a state in which a plurality of fine grooves are cut in a part corresponding to a light shielding seal of a lens barrel on the inner side.

Moreover, as shown in FIG. 39, a plurality of grooves 38 with an extremely small diameter called spiral grooves may be cut in a part of the lens barrel 14 on the inner side opposing the light shielding seal 1 fixed to the lens barrel 13 on the outer side to always guide the magnetic fluid 4 not to flow out of the light shielding seal section when the lens barrels 13 and 14 moves.

A lens barrel of a so-called zoom type camera moves forward and backward while slightly rotating, for example, in focusing or zooming. Therefore, it is also possible to always guide the magnetic fluid 4 not to flow out of the light shielding seal section when the lens barrel moves forward and backward by cutting the above-mentioned plurality of very small grooves 38 in the part of the lens barrel 14 on the inner side opposing the light shielding seal 1, taking this rotating direction and the moving direction of the lens barrel into account.

Although the above-mentioned embodiment mode is described concerning the case in which the above-mentioned grooves 38 are provided on the side of the lens barrel 14 on the inner side, the grooves 38 are not limited to the above-mentioned embodiment mode but may be provided, for example, on the side of the light shielding seal, that is, on the tip portion surfaces of the pole pieces 6 and 7, the magnet 2 or the tip portion surface of the above-mentioned shielding member 36.

Moreover, surface film processing with the oil volatilizing property may be applied to the surface of the lens barrel 14 on the inner side that the magnetic fluid 4 of the light shielding seal 1 of the above-mentioned lens barrel 13 on the outer side contacts and the surface of the other member that the above-mentioned magnetic fluid contacts.

Here, for example, the case in which an oil volatile solid film is formed on the surface of the other member or the case in which oil incompatible with the oil forming the magnetic fluid is applied to form an oil film corresponds to such surface film processing with the oil volatilizing property.

When such processing is applied, even if the magnetic fluid 4 contacts the lens barrel 14 on the inner side and the lens barrel 14 on the inner side moves, since the lens barrel 14 on the inner side is applied with the surface film processing with the oil volatilizing property and the magnetic fluid 4 is less likely to "wet" the lens barrel 14 on the inner side, the magnetic fluid 4 does not tend to flow when it contacts or slidingly contacts the other member, whereby the light shielding seal 1 is formed more reliably.

As described above, in the first aspect of the present invention, since magnetic fluid is used in a light shielding seal, the other member contacting the light shielding seal contacts the magnetic fluid, whereby a sliding resistance can be remarkably reduced compared with a sliding resistance in the prior art which is caused when solids contact each other.

In addition, even if a space for installing a light shielding seal is changed due to eccentricity of a plurality of members or there is a flash (parting line) on a parting surface, since the magnetic fluid moves following a magnetic field distribution to fill a gap between two members, eccentric follow-up property is improved and light can be completely shielded.

Moreover, as a result of the improved eccentric follow-up property, since it is not required to provide a space equal to or larger than an amount of eccentricity on the outer diameter side of the conventional light shielding seal, saving of a space can be realized.

In the second to the fourteenth aspects of the present invention, a light shielding structure capable of securing a larger power for holding magnetic fluid and shielding light more reliably, in addition to the effect of the first aspect, can be provided.

In the fifth aspect of the present invention, a light shielding structure capable of securing a larger power for holding magnetic fluid and, at the same time, effectively absorbing an error even if an assembling error or the like is caused among a plurality of members, in addition to the effect of the first aspect of the present invention, can be provided.

In the sixth aspect of the present invention, a light shielding structure capable of further improving a light shielding effect, in addition to the effect of the first aspect, can be provided.

In the seventh and the eighth aspects of the present invention, a light shielding structure capable of securing a larger power for holding magnetic fluid and shielding light more reliably, in addition to the effect of the first aspect, can be provided.

In the ninth aspect of the present invention, a light shielding structure capable of reliably shielding light between lens barrels in a camera having a plurality of lens barrels, in addition to the effect of the first aspect, can be provided.

In the tenth aspect of the present invention, a light shielding structure of a lens barrel of a camera that is easily assembled, in addition to the effect of the ninth aspect, can be provided.

In the eleventh aspect of the present invention, a light shielding structure capable of effectively absorbing the error even if the error in an axial center of a lens barrel of a camera occurs, in addition to the effect of the ninth aspect, can be provided.

In the twelfth aspect of the present invention, a light shielding structure capable of effectively preventing dusts from entering inside a lens barrel from the outside, in addition to the effect of the tenth aspect, can be provided.

In the thirteenth aspect of the present invention, a light shielding structure capable of holding magnetic fluid, which surely contacts a lens barrel of a camera, in a position of magnetic force generating means without allowing the magnetic fluid to flow away even if the lens barrel moves forward or backward, in addition to the effect of the ninth aspect, can be provided.

In the fourteenth aspect of the present invention, wetting of the magnetic fluid when it contacts with a member is prevented, thereby further improving the light shielding property, in addition to the effect of the first aspect, can be provided.

INDUSTRIAL APPLICABILITY

As described above, the light shielding structure in accordance with the present invention is very useful in shielding light between lens barrels of a multiple lens barrel camera provided with a zooming function and is very suitable not only for a camera but also for the case in which light is shielded among a plurality of members that are arranged to be able to relatively move spaced a small distance apart from each other.

What is claimed is:

1. A light shielding structure, which is provided among two members arranged to be able to reciprocate relatively to each other spaced a predetermined distance apart and is capable of preventing light from entering from gaps which are formed among these two members, comprising:

magnetic force generating means arranged in one of the two members, magnetic fluid holding means consisting of a magnetic body and being fixed to pole portions of the magnetic force generating means, and magnetic fluid being magnetically held by the magnetic field distribution of a magnetic circuit composed of the magnetic force generating means, the magnetic fluid holding means and the magnetic fluid and contacts the other of the two members, wherein the magnetic force generating means and the magnetic fluid holding means are configured to hold the magnetic fluid surely even if the two members move relatively to each other.

2. The light shielding structure according to claim 1, wherein the magnetic fluid holding means is formed in a shape that allows magnetic forces to concentrate on the side of the other of the two members.

3. The light shielding structure according to claim 1, wherein the two members are lens barrels of camera lens, and the magnetic force generating means is fixed on the inside surface portion of the lens barrel on the outer side and the magnetic fluid contacts the outside surface portion of the lens barrel on the inner side to shield gaps between the lens barrel on the inner side.

4. The light shielding structure according to claim 3, wherein the magnetic force generating means and the magnetic fluid holding means are fixed in advance to a metal member to be equipped in the end portion of the lens barrel on the outer side.

5. The light shielding structure according to claim 3, wherein the magnetic force generating means and the magnetic fluid holding means are arranged spaced apart from an inner circumference surface portion of the lens barrel on the outer side and the magnetic fluid contacts the outside surface portion of the lens barrel on the inner side.

6. The light shielding structure according to claim 3, wherein a shielding member that can prevent dusts from entering from the outside is provided on the magnetic fluid holding means.

7. The light shielding structure according to claim 3, wherein a groove is cut inclining at a predetermined angle with respect to a rotational direction of a lens barrel on the inner side in the a tip portion of the magnetic force generating means or the magnetic fluid holding means faced the lens barrel on the inner side or on the external surface of the lens barrel on the inner side such that the magnetic fluid can be held in a position of the magnetic force generating means by a relative rotational motion of the lens barrel on the inner side and the lens barrel on the outer side.

8. A light shielding structure, which is provided among two members arranged to be able to reciprocate relative to each other spaced a predetermined distance apart and is capable of preventing light from entering from gaps which are formed among the two members, comprising:

magnetic force generating means consisting of two magnets arranged in one of the two members, porous materials disposed between the two magnets of the magnetic force generating means so that a tip of the porous materials projects toward the other of the two members, and magnetic fluid held by magnetic force of the magnetic force generating means and a capillary force of the porous materials and contacts the other of the two members even if the two members move relative to each other.

9. A light shielding structure, which is provided among two members arranged to be able to reciprocate relatively to each other spaced a predetermined distance apart and is capable of preventing light from entering from gaps which are formed among the two members, comprising:

magnetic force generating means consisting only of magnets and arranged in a recessed portion formed by part of any one of the two members with a gap formed between the bottom portion of the recessed portion and a surface of the magnetic force generating means facing the bottom portion of the recessed portion, and magnetic fluid magnetically held by the magnetic force generating means and contacts the other of the two members, wherein the magnetic force generating means is configured to be able to hold the magnetic fluid securely even if the two members move relative to each other and floats from the other of the two members by the magnetic fluid held by the magnetic force.

* * * * *

UNITED STATES PATENT AND TRADEMARK OFFICE
CERTIFICATE OF CORRECTION

PATENT NO. : 6,733,143 B1  
DATED : May 11, 2004  
INVENTOR(S) : Anzai et al.

Page 1 of 1

It is certified that error appears in the above-identified patent and that said Letters Patent is hereby corrected as shown below:

<u>Title page,</u>  
Item [75], Inventors, please change "Tsukuba" to -- Ibaraki --.  
Please add the following PCT information:

-- [86] PCT No.: PCT/JP00/03442 filed 29 May 2000 --.

Signed and Sealed this

Twenty-first Day of December, 2004

JON W. DUDAS  
*Director of the United States Patent and Trademark Office*